(12) United States Patent
Hamano et al.

(10) Patent No.: US 10,630,883 B2
(45) Date of Patent: Apr. 21, 2020

(54) IMAGE CAPTURING APPARATUS AND FOCUS DETECTION METHOD

(71) Applicant: CANON KABUSHIKI KAISHA, Tokyo (JP)

(72) Inventors: Hideyuki Hamano, Kawasaki (JP); Akihiko Kanda, Kawasaki (JP); Yoshihito Tamaki, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 21 days.

(21) Appl. No.: 16/167,833

(22) Filed: Oct. 23, 2018

(65) Prior Publication Data

US 2019/0132508 A1 May 2, 2019

(30) Foreign Application Priority Data

Oct. 27, 2017 (JP) .................... 2017-207731

(51) Int. Cl.

| | |
|---|---|
| *H04N 5/232* | (2006.01) |
| *G01J 3/02* | (2006.01) |
| *G02B 7/38* | (2006.01) |
| *H04N 9/04* | (2006.01) |
| *H04N 5/357* | (2011.01) |
| *G02B 27/00* | (2006.01) |

(52) U.S. Cl.
CPC ........ *H04N 5/23212* (2013.01); *G01J 3/0208* (2013.01); *G02B 27/0037* (2013.01); *H04N 5/23229* (2013.01); *H04N 5/23245* (2013.01); *H04N 5/232122* (2018.08); *H04N 5/3572* (2013.01); *H04N 9/045* (2013.01)

(58) Field of Classification Search
CPC ......... H04N 5/23212; H04N 5/232122; H04N 5/3572; H04N 5/23229; H04N 9/045; G02B 7/38; G02B 15/00; G02B 27/0037; G01J 3/0208
See application file for complete search history.

(56) References Cited

U.S. PATENT DOCUMENTS

| | | | | |
|---|---|---|---|---|
| 9,277,201 | B2* | 3/2016 | Izawa | ............... H04N 5/23229 |
| 9,699,427 | B2* | 7/2017 | Hayashi | ............... G06T 5/003 |
| 10,122,911 | B2* | 11/2018 | Takao | ............... H04N 5/23212 |
| 10,326,924 | B2* | 6/2019 | Takao | ............... H04N 5/23212 |
| 2015/0227023 | A1* | 8/2015 | Hamano | ............... G03B 13/36 |
| | | | | 348/169 |

FOREIGN PATENT DOCUMENTS

JP 4272717 B 6/2009

* cited by examiner

*Primary Examiner* — Ngoc Yen T Vu
(74) *Attorney, Agent, or Firm* — Cowan, Liebowitz & Latman, P.C.

(57) ABSTRACT

An image capturing apparatus includes an image sensor and a focus detector. The focus detector corrects a result of the focus detection by using a difference between a first focus position calculated as a focus position in image capturing by using aberration information of the image capturing optical system and first calculation information according to a spectroscopic characteristic of first light and a second focus position calculated as a focus position in the focus detection by using the aberration information and second calculation information according to the spectroscopic characteristic of the first light, and changes the second calculation information in the focus detection between when second light having a spectroscopic characteristic different from that of the first light is emitted to the object, and when the second light is not emitted.

23 Claims, 24 Drawing Sheets

|  | HORIZONTAL ||| VERTICAL |||
|---|---|---|---|---|---|---|
|  | RED | GREEN | BLUE | RED | GREEN | BLUE |
| FOR NORMAL LIGHT AF | K_AFN_RH | K_AFN_GH | K_AFN_BH | K_AFN_RV | K_AFN_GV | K_AFN_BV |
| FOR AUXILIARY LIGHT AF | K_AFL_RH | K_AFL_GH | K_AFL_BH | K_AFL_RV | K_AFL_GV | K_AFL_BV |
| FOR IMAGE CAPTURING | K_IMG_RH | K_IMG_GH | K_IMG_BH | K_IMG_RV | K_IMG_GV | K_IMG_BV |
FIG. 8A
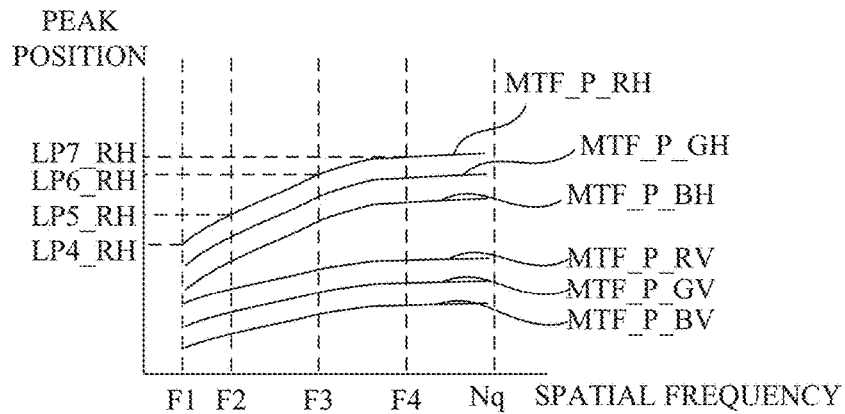
FIG. 8B
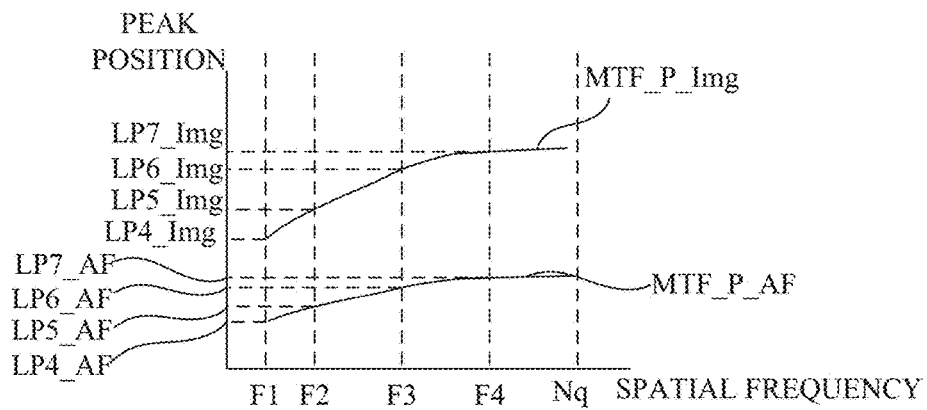
FIG. 8C

|  | HORIZONTAL | | | VERTICAL | | |
|---|---|---|---|---|---|---|
|  | RED | GREEN | BLUE | RED | GREEN | BLUE |
| FOR NORMAL LIGHT AF | K_AFN_RH | K_AFN_GH | K_AFN_BH | K_AFN_RV | K_AFN_GV | K_AFN_BV |
| FOR AUXILIARY LIGHT AF (INTERNAL) | K_AFLin_RH | K_AFLin_GH | K_AFLin_BH | K_AFLin_RV | K_AFLin_GV | K_AFLin_BV |
| FOR AUXILIARY LIGHT AF (EXTERNAL) | K_AFLout_RH | K_AFLout_GH | K_AFLout_BH | K_AFLout_RV | K_AFLout_GV | K_AFLout_BV |
| FOR IMAGE CAPTURING | K_IMG_RH | K_IMG_GH | K_IMG_BH | K_IMG_RV | K_IMG_GV | K_IMG_BV |

FIG. 12

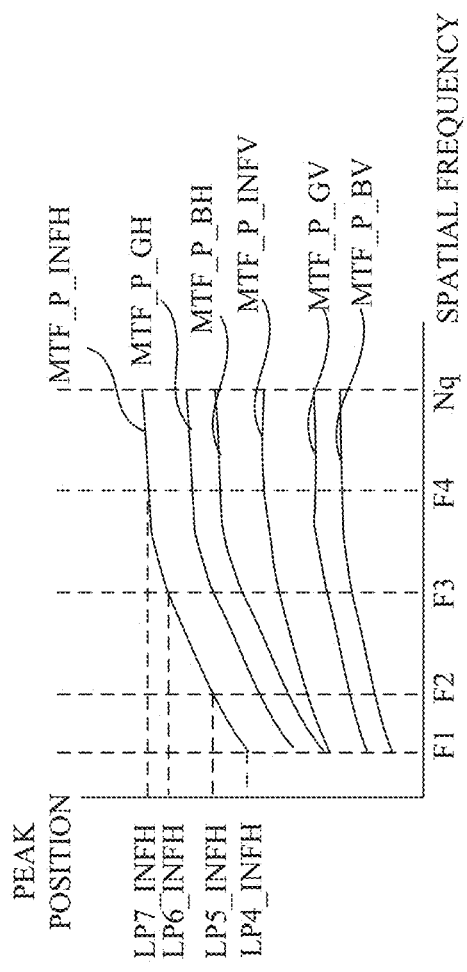

FIG. 18

| | HORIZONTAL | | | VERTICAL | | |
|---|---|---|---|---|---|---|
| | INFRARED | GREEN | BLUE | INFRARED | GREEN | BLUE |
| FOR NORMAL LIGHT AF | K_AFN_INFH | K_AFN_GH | K_AFN_BH | K_AFN_INFV | K_AFN_GV | K_AFN_BV |
| FOR AUXILIARY LIGHT AF (INTERNAL) | K_AFLin_INFH | K_AFLin_GH | K_AFLin_BH | K_AFLin_INFV | K_AFLin_GV | K_AFLin_BV |
| FOR AUXILIARY LIGHT AF (EXTERNAL) | K_AFLout_INFH | K_AFLout_GH | K_AFLout_BH | K_AFLout_outF | K_AFLout_GV | K_AFLout_BV |
| FOR IMAGE CAPTURING | K_IMG_INFH | K_IMG_GH | K_IMG_BH | K_IMG_INFV | K_IMG_GV | K_IMG_BV |

FIG. 19

|  | HORIZONTAL | | | VERTICAL | | |
|---|---|---|---|---|---|---|
|  | NIR | RED | GREEN | BLUE | NIR | RED | GREEN | BLUE |
| FOR NORMAL LIGHT AF | --- | K_AFN_RH | K_AFN_GH | K_AFN_BH | --- | K_AFN_RV | K_AFN_GV | K_AFN_BV |
| FOR AUXILIARY LIGHT AF | K_AFL_NIRH | K_AFL_RH | K_AFL_GH | K_AFL_BH | --- | K_AFL_RV | K_AFL_GV | K_AFL_BV |
| FOR IMAGE CAPTURING | --- | K_IMG_RH | K_IMG_GH | K_IMG_BH | --- | K_IMG_RV | K_IMG_GV | K_IMG_BV |

FIG. 21A

|  | HORIZONTAL | | | |
|---|---|---|---|---|
|  | NIR | RED | GREEN | BLUE |
| FOR NORMAL LIGHT AF | --- | K_AFN_RH | K_AFN_GH | K_AFN_BH |
| FOR AUXILIARY LIGHT AF (EXTERNAL) | K_AFL_NIRH | K_AFL_RH | K_AFL_GH | K_AFL_BH |
| FOR AUXILIARY LIGHT AF (INTERNAL) | --- | K_AFLin_RH | K_AFLin_GH | K_AFLin_BH |
| FOR IMAGE CAPTURING | --- | K_IMG_RH | K_IMG_GH | K_IMG_BH |

|  | VERTICAL | | | |
|---|---|---|---|---|
|  | NIR | RED | GREEN | BLUE |
| FOR NORMAL LIGHT AF | --- | K_AFN_RV | K_AFN_GV | K_AFN_BV |
| FOR AUXILIARY LIGHT AF (EXTERNAL) | --- | K_AFL_RV | K_AFL_GV | K_AFL_BV |
| FOR AUXILIARY LIGHT AF (INTERNAL) | --- | K_AFLin_RV | K_AFLin_GV | K_AFLin_BV |
| FOR IMAGE CAPTURING | --- | K_IMG_RV | K_IMG_GV | K_IMG_BV |

FIG. 24A

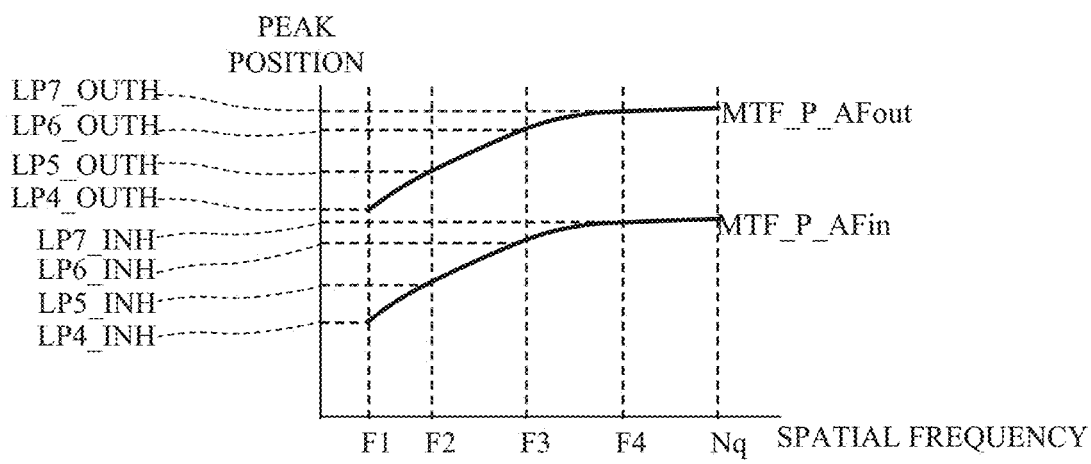

FIG. 24B

IMAGE CAPTURING APPARATUS AND FOCUS DETECTION METHOD

BACKGROUND OF THE INVENTION

Field of the Invention

The present invention relates to an image capturing apparatus, such as a digital camera and a video camera.

Description of the Related Art

The automatic focus ("AF") method for the image capturing apparatus contains a contrast detection (TVAF) method and a phase difference detection method, and some image capturing apparatuses use an image sensor as a focus detecting sensor in these AF methods, Since these AF methods detect a focus state by using an optical image formed on the image sensor, the aberration of the image capturing optical system that forms the optical image gives an error to the focus detection result. For example, red or near-infrared light is used as AF auxiliary light so as to prevent the object (person) from dazzling. When this AF auxiliary light is irradiated onto the object for a focus detection, then the irradiation of the AF auxiliary light is stopped, and an image is captured, the influence of the aberration of the image capturing optical system on the spectroscopic characteristic of the AF auxiliary light causes an error in the focus detection result.

Japanese Patent No. ("JP") 4,272,717 discloses an image capturing apparatus that provides a more accurate focus detection by storing in a memory the focus detection result error as a correction amount used for the irradiation of the AF auxiliary light.

The AF auxiliary light may have a variety of spectroscopic characteristics, such as green light that is used for a self-timer function and a red-eye reduction function, white light used for the illumination in motion image capturing, in addition to the red light and the near infrared light. In this case, the image capturing apparatus disclosed in JP 4,272,717 needs to store a correction amount for each AF auxiliary light and for each optical state (zoom state, focus state, F-number etc.) having a different aberration of the image capturing optical system. A lens interchangeable type image capturing apparatus needs to store a correction amount for each interchangeable lens with different aberrations to be mounted. As a result, a necessary memory capacity increases.

SUMMARY OF THE INVENTION

The present invention provides an image capturing apparatus that can suppress an increase of a memory capacity, and satisfactorily correct a focus detection error caused by an aberration of an image capturing optical system even when AF auxiliary light beams having various spectroscopic characteristics are used.

An image capturing apparatus according to one aspect of the present invention includes an image sensor configured to capture an object image formed from light that enters an image capturing optical system from an object, and a focus detector configured to provide a focus detection using a focus detecting signal from the image sensor. The focus detector corrects a result of the focus detection by using a difference between a first focus position calculated as a focus position in image capturing by using aberration information of the image capturing optical system and first calculation information according to a spectroscopic characteristic of first light and a second focus position calculated as a focus position in the focus detection by using the aberration information and second calculation information according to the spectroscopic characteristic of the first light, and changes the second calculation information in the focus detection between when second light having a spectra scopic characteristic different from that of the first light is emitted to the object, and when the second light is not emitted.

Further features of the present invention will become apparent from the following description of exemplary embodiments with reference to the attached drawings.

BRIEF DESCRIPTION OF THE DRAWINGS

FIGS. 8A to 8C explain the BP correction value calculation processing according to the first embodiment.

FIG. 12 illustrates setting information for the BP correction value calculation according to the second embodiment.

FIG. 18 explains the BP correction value calculation processing according to the fourth embodiment.

FIG. 19 illustrates setting information for the BP correction value calculation according to the fourth embodiment.

FIGS. 21A to 21C explain BP correction value calculation processing according to the fifth embodiment.

FIGS. 24A and 24B illustrates setting information for the BP correction value calculation according to the sixth embodiment.

DESCRIPTION OF THE EMBODIMENTS

Referring now to the accompanying drawings, a description will be given of embodiments according to the present invention.

First Embodiment

Figure 2:
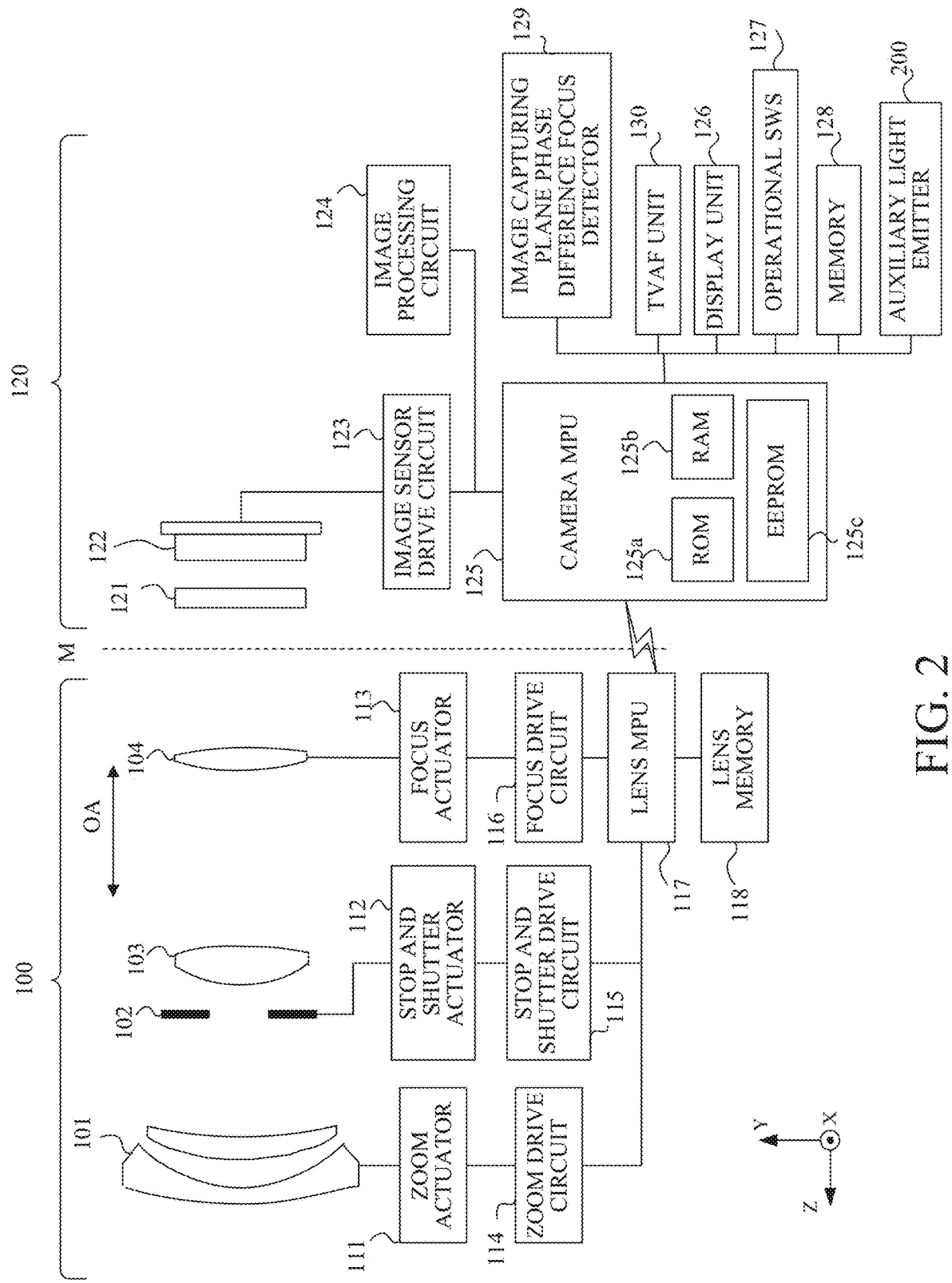
FIG. 2 is a block diagram of a configuration of a digital camera according to each embodiment.

FIG. 2 is a block diagram illustrating a configuration of a digital camera as an illustrative image capturing apparatus according to this embodiment. The digital camera according to this embodiment is an interchangeable lens type single-lens reflex camera and includes a lens unit 100 and a camera main body 120. The lens unit (interchangeable lens) 100 is attached to the camera body 120 via a mount M indicated by a dotted line at the center of the figure.

This embodiment discusses a lens interchangeable type single-lens reflex camera, but this embodiment according to the present invention is applicable to another image capturing apparatus such as a lens integrated type camera, a mirrorless (non-reflex) camera, and a video camera in addition to a variety of electronic apparatuses having a camera function such as a mobile phone, a personal computer, a game machine, etc. as image capturing apparatuses.

The lens unit 100 includes a lens optical system and a drive and control system. The lens optical system includes a first lens unit 101, an aperture stop (diaphragm) 102, a second lens unit 103, and a focus lens unit (simply referred to as a focus lens hereinafter) 104, and forms an object image which is an optical image of an object.

The first lens unit 101 is disposed at the tip of the lens unit 100 and held movable in the optical axis direction OA. The aperture stop 102 serves to adjust a light quantity and also serves as a mechanical shutter that controls the exposure time in still image capturing. The aperture stop 102 and the second lens unit 103 are integrally movable in the optical axis direction OA, and move in association with the first lens unit 101 for magnification variations. The focus lens 104 moves in the optical axis direction OA so as to change an object distance (focal length) at which the lens unit 100 is focused or for focusing.

A drive and control system includes a zoom actuator 111, a stop (and shutter) actuator 112, a focus actuator 113, a zoom drive circuit 114, a stop (and shutter) drive circuit 115, a focus drive circuit 116, a lens MPU 117, and a lens memory 118. The zoom drive circuit 114 drives the first lens unit 101 and the third lens unit 103 in the optical axis direction OA through the zoom actuator 111. The stop drive circuit 115 drives the aperture stop 102 through the stop actuator 112 to control the aperture diameter and opening and closing operations of the aperture stop 102. The focus drive circuit 116 drives the focus lens 104 in the optical axis direction OA through the focus actuator 113. The focus drive circuit 116 detects a current position of the focus lens 104 through the focus actuator 113.

The lens MPU (microprocessor unit) 117 performs all calculations and controls for the lens unit 100. The controls also include controls of the zoom drive circuit 114, the stop drive circuit 115, and the focus drive circuit 116. The lens MPU 117 is electrically connected to the camera MPU 125 through a communication terminal provided on the mount M, and communicates commands and data with the camera MPU 125. For example, the lens MPU 117 detects the position of the focus lens 104 (referred to as a focus lens position hereinafter) and notifies the camera MPU 125 of the focus lens information containing the detected focus lens position in response to a request from the camera MPU 125. The focus lens information contains the position of the focus lens 104 in the optical axis direction OA, the position in the optical axis direction OA and diameter of the exit pupil, the position in the optical axis direction OA and diameter of a lens frame for limiting the light beam from the exit pupil, and the like. In response to the request from the camera MPU 125, the lens MPU 117 also controls the zoom drive circuit 114, the stop drive circuit 115, and the focus drive circuit 116.

The lens memory 118 previously stores optical information necessary for a focus detection described later. The camera MPU 125 executes the above calculations and controls by executing, for example, an internal nonvolatile memory or a computer program stored in the lens memory 118.

The camera body 120 includes an optical low-pass filter 121, an image sensor 122, and a drive and control system. The lens optical system and the optical low-pass filter 121 constitute an image capturing optical system.

The optical low-pass filter 121 is provided to reduce a false color and moiré in a captured image acquired by the image sensor 122. The image sensor 122 includes a CMOS image sensor and a peripheral circuit. The image sensor 122 according to this embodiment has a pupil division function, and can perform a focus detection by a phase difference detection method using an output signal (focus detection signal) from the image sensor 122. The focus detection by the phase difference detection method and the position control of the focus lens 104 based on the result of the focus detection are collectively referred to as a phase difference AF.

The drive and control system includes a sensor drive circuit 123, an image processing circuit 124, the camera MPU 125, a display unit 126, operational switches 127, a memory 128, a phase difference AF unit 129, and a TVAF unit 130.

The sensor drive circuit 123 controls the operation of the image sensor 122 and A/D-converts an analog image signal acquired from the image sensor 122, and transmits it to the camera MPU 125. The image processing circuit 124 performs image processing, such as a gamma conversion, white balance adjustment processing, color interpolation processing, and compressive coding processing, for the digital image data obtained by the A/D conversion, and generates displaying and recording image data. The image processing circuit 124 generates focus detection data for the phase difference AF and luminance data for AF (hereinafter referred to as TVAF) in the contrast detection method based on the digital image data.

The camera MPU 125 performs all calculations and controls relating to the camera body 120. The control contains controls of the sensor drive circuit 123, the image processing circuit 124, the display device 126, the operational switches 127, the memory 128, the phase difference AF unit 129, and the TVAF unit 130. The camera MPU 125 is connected to the lens MPU 117 via a communication terminal provided on the mount M and communicates commands and data with the lens MPU 117. The camera MPU 125 sends an acquisition request of the lens position information, an aperture stop (diaphragm), a focus, and a zoom drive request to the lens MPU 117 via communications. The camera MPU 125 requests the lens MPU 117 for optical information peculiar to the lens unit 100 via communications. The camera MPU 125 includes a ROM 125a that stores a computer program, a RAM (memory) 125b that stores variables, and an EEPROM 125c that stores various parameters. The camera MPU 125 performs the above calculations and controls according to the computer program stored in the ROM 125a.

The display unit 126 includes a display device, such as an LCD, and displays information on an image capturing mode, a preview image before image capturing, a confirmation image after image capturing, an in-focus state index in the AF, and the like. The operational switches 127 include operational members operable by a user such as a power switch, a release (imaging trigger) switch, a, zoom operation switch, an image capturing mode selection switch, and the like. The memory 128 as a recorder is a flash memory that can be attached to and detached from the camera body 120, and records a captured image.

The phase difference AF unit 129 performs the phase difference AF by using the focus detection data obtained by the image processing circuit 124. More specifically, the image processing circuit 124 generates a pair of phase difference image signals (A image signal and B image signal described later) as phase difference focus detecting signals from the output signal (image signal) of the image sensor 122 that has captured a pair of object images formed by the light beam having passed through a pair of pupil regions in the image capturing optical system. The phase difference AF unit 129 calculates a defocus amount based on a deviation amount (image shift amount) between the pair of phase difference image signals. The phase difference AF unit 129 transmits a focus drive request, which is a control command for driving the focus lens 104, to the lens MPU 117 according to the calculated defocus amount.

Thus, the phase difference AF unit 129 according to this embodiment performs an image capturing plane phase difference AF as a phase difference AF based on the output of the image sensor 122 rather than the dedicated AF sensor. The operation of the phase difference AF unit 129 will be described later in detail.

The TVAF unit 130 performs the TVAF based on a TVAF focus evaluation (evaluation value indicating the contrast state of the image data) generated by the image processing circuit 124. The TVAF moves the focus lens 104 to detect a focus lens position as the in-focus position that provides a peak of the focus evaluation value, and then moves the focus lens 104 to that position.

As described above, the camera according to this embodiment can execute both the phase difference AF and TVAF, and use them individually or in combination depending on the situation.

The auxiliary light emitter (or emitting unit) 200 sets the emission and non-emission according to emission and non-emission instructions from the camera MPU 125. Where the object to be focused has a low contrast or a low illuminance, the AF is more likely to be available by emitting the auxiliary light.

Figure 3A:
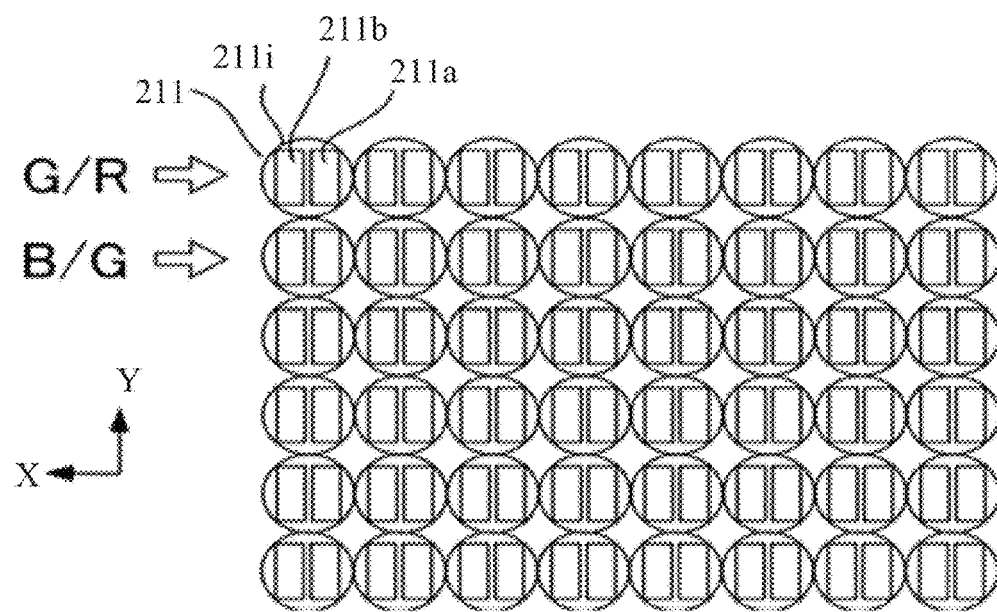
FIGS. 3A and 3B illustrate a configuration of an image sensor according to each embodiment.

Next, a detailed description will be given of an operation of the phase difference AF unit 129. FIG. 3A illustrates a pixel arrangement of the image sensor 122, which is a pixel range of six vertical rows (Y-direction) and eight lateral transverse columns (X-direction) of a two-dimensional CMOS sensor viewed from the lens unit 100 side. The image sensor 122 is provided with color filters in the Bayer arrangement. More specifically, green (G) and red (R) color filters are alternately arranged in order from the left on odd rows, and blue (B) and green (G) color filters are alternately arranged in order from the left on even rows. In the pixel 211, a circle 211i represents an on-chip micro lens, and a plurality of rectangles 211a and 211b disposed inside the micro lens 211i represent photoelectric converters, respectively.

In all pixels in the image sensor 122, the photoelectric converter is divided into two in the X direction. A photoelectric conversion signal may be separately read out of a photoelectric converter in each pixel, or a sum of the photoelectric conversion signals may be read out of two photoelectric converters. A signal corresponding to the photoelectric conversion signal of the other photoelectric converter can be obtained by subtracting the photoelectric conversion signal of one photoelectric converter from the sum of photoelectric conversion signals. The photoelectric conversion signal from the photoelectric converter can be used to generate the above pair of phase difference image signals or a pair of parallax images for presenting a 3D image. The sum of the photoelectric conversion signals is used to generate normal image data (live-view image or captured image).

In the phase difference AF, the micro lens 211i of FIG. 3A and the two divided photoelectric converters 211a and 211b divide an exit pupil in the image capturing optical system (this action will be referred to as a pupil division hereinafter). Assume that for a plurality of pixels 211 in a predetermined range in the same pixel row, a signal generated by connecting the outputs of one photoelectric converter 211a will be referred to as an A image signal used for a focus detection, and a signal generated by connecting the outputs of the other photoelectric converter 211b will be referred to as a B image signal used for a focus detection. The outputs of the photoelectric converters 211a and 211b use a pseudo luminance (Y) signal calculated by adding green, red, blue, and green outputs contained in the unit array of the color filter. However, the A image signal and the B image signal may be generated for each of R, G, and B colors. A defocus amount can be calculated as a defocus amount within the predetermined range by correlation-calculating a relative shift amount between the A image signal and the B image signal generated in this way.

This embodiment reads an output of one photoelectric converter and a sum of outputs of both photoelectric converters out of each pixel. For example, in reading the output of the photoelectric converter 211a and the sum of the outputs of the photoelectric converters 211a and 211b, the output of the photoelectric converter 211b is obtained by subtracting the output of the photoelectric converter 211a from the sum. Thereby, both the A image signal and the B image signal can be obtained, and the phase difference AF can be realized.

Figure 3B:
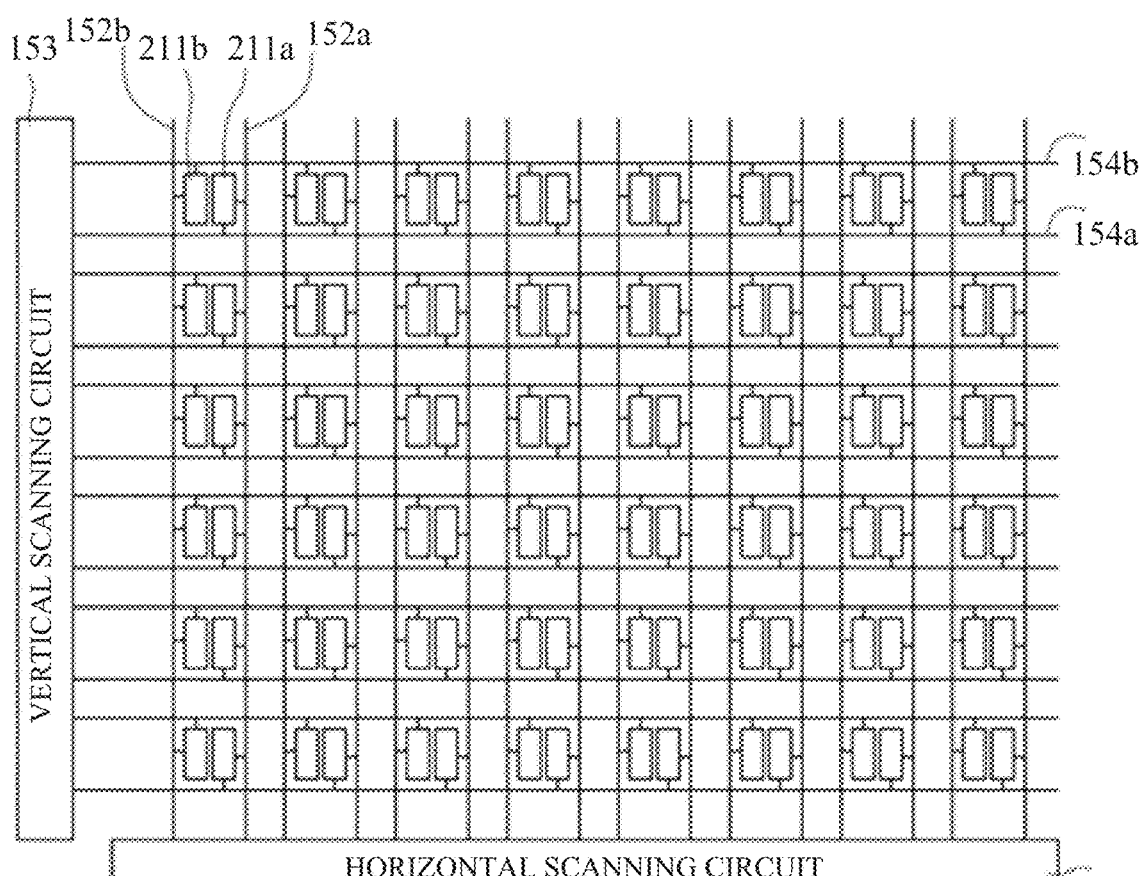

FIG. 3B illustrates a configuration of a read circuit of the image sensor 122. Reference numeral 151 denotes a horizontal scanning circuit, and reference numeral 153 denotes a vertical scanning circuit. Horizontal scanning lines 152a and 152b and vertical scanning lines 154a and 154b are wired at the boundary portion between the respective pixels. From each photoelectric converter, a signal is read out to the outside via these scan lines.

Assume that the image sensor according to this embodiment has the following two types of read modes in addition to the above read method in the pixel. The first read mode is an all (or full) pixel read mode used to capture a high-definition still image. In this mode, signals from all pixels are read out. The second read mode is a thinning read mode used to record a motion image or to display a live-view image. In this mode, signals are read out of only pixels fewer than all the pixels or pixels thinned with a predetermined ratio in both X and Y directions. This second read mode is also used when it is necessary to read signals at a high speed. In thinning in the X direction, signals are added to improve the S/N ratio. In thinning in the Y direction, a signal output of a row to be thinned is ignored. The phase difference AF and TVAF are normally performed using the signal read out in the second read mode.

Figure 4A:
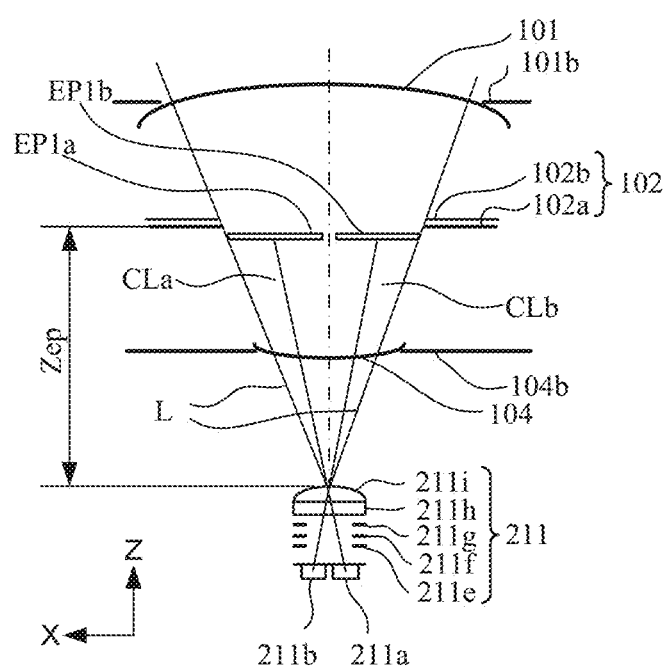
FIGS. 4A and 4B illustrate a relationship between a photoelectric conversion area and an exit pupil according to each embodiment.
Figure 4B:
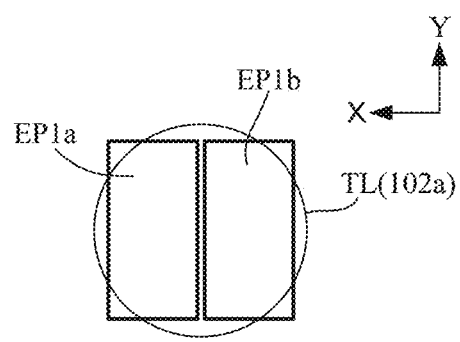

Referring now to FIGS. 4A and 4B, a description will be given of a conjugate relationship between an exit pupil plane of an image capturing optical system, an image height zero in the image sensor or a pixel (photoelectric converter) near the center of the image plane. The photoelectric converter and the exit pupil plane of the image capturing optical system are made conjugate with each other by the micro lens 211i. The position of the exit pupil in the image capturing optical system generally coincides with the position at which an iris stop for adjusting a light quantity is disposed. The image capturing optical system according to this embodiment has a magnification variation function, and the magnification variation changes a size and a distance (exit pupil distance) from the image plane to the exit pupil. FIG. 4A illustrates a focal length of the lens unit 100 located at the middle of the wide angle end and the telephoto end. An exit pupil distance Zep in this state is set to a standard value, and the eccentricity parameter is optimized based on the shape of the micro lens 211i and the image height (XY coordinates).

In FIG. 4A, reference numeral 101b denotes a barrel member configured to hold the first lens unit 101, and reference numeral 104b denotes a barrel member configured to hold the focus lens 104. Reference numeral 102a denotes an aperture plate having an aperture for determining an aperture diameter in opening the aperture stop 102, and reference numeral 102b denotes a stop blade configured to adjust the aperture diameter in narrowing down. The lens barrel member 101b, the aperture plate 102a, the stop blade 102b, and the lens barrel member 104b serve as a limiting member for limiting a light beam to pass through the image capturing optical system, and show an optical virtual image when viewed from the image plane side. The combined aperture near the aperture stop 102 is defined as the exit pupil in the image capturing optical system, and the exit pupil distance from the image plane is defined as Zep as described above.

The pixel 211 is disposed near the center of the image plane and will be referred to as a center pixel in this embodiment. The central pixel 211 includes, in order from a bottom layer, the photoelectric converters 211a and 211b, wiring layers 211e to 211g, a color filter 211h, and the micro lens 211i. The two photoelectric converters 211a and 211b are back projected onto the exit pupil plane in the image capturing optical system by the micro lens 211i. In other words, different regions (pupil regions) EP1a and EP1b in the exit pupil in the image capturing optical system are projected onto the surfaces of the photoelectric converters 211a and 211b via the micro lens 211i.

FIG. 4B illustrates the EP1a and EP1b back projected of the photoelectric converters 211a and 211b on the exit pupil plane in the image capturing optical system viewed from the optical axis direction. The image sensor 122 can output a signal from one of the two photoelectric converters 101a and 101b and includes pixels that can add and output signals from both of them. The added and output signals are obtained by photoelectrically converting all light beams passing through the focus detecting pupils EP1a and EP1b.

In FIG. 4A, a light beam L (having an outer edge drawn by a straight line in FIG. 4A) passing through the image capturing optical system is limited by the aperture plate 102a of the aperture stop 102, and the light beams of the pupil regions EP1a and EP1b reach the pixels without being shielded by the image capturing optical system. FIG. 4B illustrates a section (outer edge) TL of the light beam L illustrated in FIG. 4A on the exit pupil plane. Since most of the back projected images EP1a and EP1b of the two photoelectric converters 211a and 211b are included in the circle indicated by TL (or the aperture of the aperture plate 102a), it is understood that the back projection images EP1a and EP1b are little shielded. At the center of the exit pupil plane, the back projected images EP1a and EP1b are symmetrically shielded with respect to the optical axis (as indicated by an alternate long and short dash line in FIG. 4A) in the image capturing optical system, and the light quantities received by the photoelectric converters 211a and 211b are equal to each other.

In the phase difference AF, the camera MPU 125 controls the sensor drive circuit 123 so as to read the output signal out of the image sensor 122 in the above two kinds of reading modes. Then, the camera MPU 125 provides the information of the focus detection area to the image processing circuit 124 so as to generate the A image signal and the B image signal from the output of the pixel in the focus detection area, and to supply the signals to the phase difference AF unit 129. In accordance with this instruction, the image processing circuit 124 generates the A image signal and the B image signal and outputs them to the phase difference AF unit 129. The image processing circuit 124 supplies the RAW image data to the TVAF unit 130. Thus, the image sensor 122 constitutes the focus detector with respect to both the phase difference AF and the TVAF.

While this embodiment has discussed the exit pupil in the image capturing optical system into two in the horizontal direction, at least part of pixels on the image sensor may be divide the exit pupil into two in the vertical direction. Alternatively, the exit pupil may be divided in both horizontal and vertical directions. The pixel that divides the exit pupil in the vertical direction enables a phase difference AF corresponding to the contrast of the object in the vertical and horizontal directions.

Figure 5:
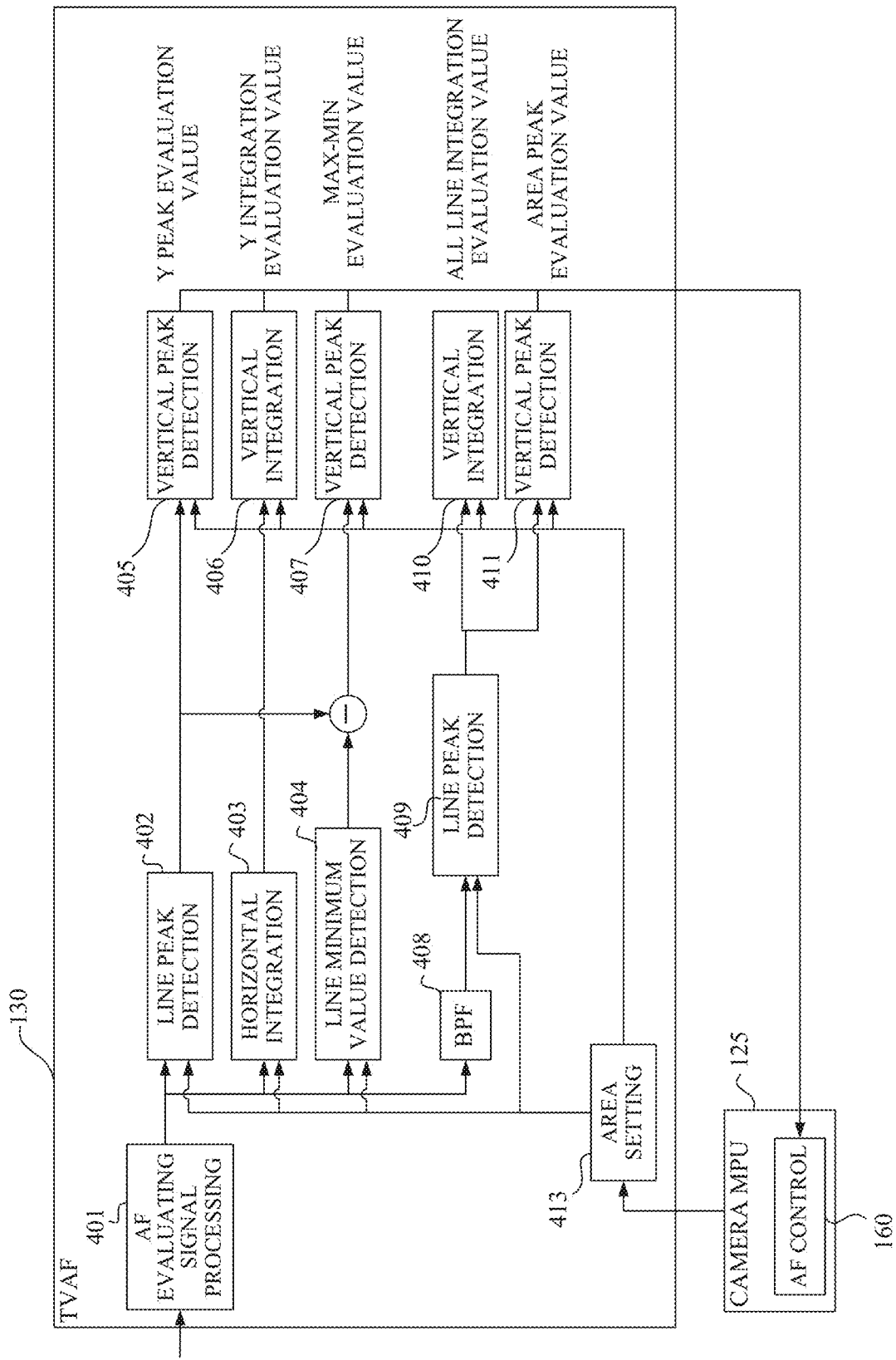
FIG. 5 is a block diagram of a configuration of a TVAF unit in FIG. 2.

Referring now to FIG. 5, a description will be given of the TVAF (contrast AF). The TVAF is realized by a cooperation of the camera MPU 125 and the TVAF unit 130 to repeatedly drive the focus lens 104 by a predetermined amount and to calculate the focus evaluation value. FIG. 5 illustrates the configuration of the TVAF unit 130.

RAW image data is input from the image processing circuit 124 to an AF evaluation signal processing circuit 401 in the TVAF unit 130. The AF evaluation signal processing circuit 401 extracts the G signal from the RAW image data and performs a gamma correction process that emphasizes a low luminance component of the G signal and suppresses a high luminance component. At this time, the gamma correction processing may be performed for all R, G, and B signals. Alternatively, a luminance (Y) signal may be generated using the R, G and B signals. In the following description, a signal output from the AF evaluation signal processing circuit 401 is referred to as a luminance signal Y regardless of the type of the signal.

The camera MPU 125 sets to an area setting circuit 413 a focus detection area for the focus detection within the RAW image data (or the image capturing range). The area setting circuit 413 generates a gate signal used to select a signal in the set focus detection area. The gate signal is input to a line peak detection circuit 402, a horizontal intuation circuit 403, a line minimum value detection circuit 404, a line peak detection circuit 409, vertical integration circuits 406 and 410, and vertical peak detection circuits 405, 407, and 411. The camera MPU 125 controls the timing at which the luminance signal Y is input to each circuit so that the focus evaluation value is generated from the luminance signal Y in the focus detection area. A plurality of focus detection areas can be set to the area setting circuit 413.

A description will now be given of a method of calculating the Y peak evaluation value as one of the focus evaluation values. The luminance signal Y that has undergone the gamma correction processing is input to the line peak detection circuit 402. The line peak detection circuit 402 finds the Y line peak value for each horizontal line in the focus detection area set in the area setting circuit 413. The output of the line peak detection circuit 402 is peak-held in the vertical direction in the focus detection area by the vertical peak detection circuit 405, and thereby the Y peak evaluation value is generated. The Y peak evaluation value is an effective index for determining whether it is a high luminance object or a low illuminance object.

A description will be given of a method of calculating the Y integral evaluation value which is another of the focus evaluation values. The gamma-corrected luminance signal Y is input to the horizontal integration circuit 403. The horizontal integration circuit 403 obtains the Y integration value for each horizontal line in the focus detection area. The output of the horizontal integration circuit 403 is integrated in the vertical direction in the focus detection area in the vertical integration circuit 406. Thereby, the Y integration evaluation value is generated. The Y integration evaluation value can be used as an index for determining the brightness in the entire focus detection area.

A method for calculating the Max-Min evaluation value as another focus evaluation value will be described. The gamma-corrected luminance signal Y is input to the line peak detection circuit 402. The line peak detection circuit 402 finds the Y line peak value for each horizontal line in the focus detection area. The gamma-corrected luminance signal Y is input to the line minimum value detection circuit 404. The line minimum value detection circuit 404 detects the minimum value of Y for each horizontal line in the focus detection area. The detected line peak value and minimum value of Y for each horizontal line are input to a subtractor, and thereby (line peak value-minimum value) is input to the vertical peak detection circuit 407. The vertical peak detection circuit 407 holds the peak in the focus detection area in the vertical direction, and generates a Max-Min evaluation value. The Max-Min evaluation value is an effective index for determining whether it is a low contrast or a high contrast.

A description will be given of a method of calculating an area peak evaluation value as still another focus evaluation value. The luminance signal Y that has received the gamma correction processing passes through the BPF 408, which extracts a specific frequency component and generate a focus signal. This focus signal is input to the line peak detection circuit 409. The line peak detection circuit 409 finds a line peak value for each horizontal line in the focus detection area. The line peak value is peak-held in the focus detection area by the vertical peak detection circuit 411, thereby a region peak evaluation value is generated. Since the region peak evaluation value few changes even when the object moves in the focus detection area, it is an effective index for the restart determination that again determines whether to shift to the processing for searching the in-focus position from the in-focus state.

A description will now be given of a method of calculating full line integration evaluation values as the final focus evaluation value. Similar to the area peak evaluation value, the line peak detection circuit 409 finds a line peak value for each horizontal line in the focus detection area. Next, the line peak detection circuit 409 inputs the line peak value to the vertical integration circuit 410. The vertical integration circuit 410 integrates the total number of horizontal scanning lines in the vertical direction in the focus detection area to generate a total line integral evaluation value. The high frequency full line integration evaluation value has a main focus evaluation value because it has a wide dynamic range and a high sensitivity due to the integration effect. Thus, the simply described focus evaluation value in this embodiment means the full line integration evaluation value.

The AF control unit 160 in the camera MPU 125 acquires each above evaluation value and moves the focus lens 104 by a predetermined amount in a predetermined direction in the optical axis direction through the lens MPU 117. Then, each evaluation value is calculated from newly obtained RAW image data, and the focus lens position that provides the full line integration evaluation value with the maximum value is detected.

This embodiment calculates each evaluation value in the horizontal line direction and the vertical line direction, respectively. This configuration can perform the TVAF using the contrast information of the object in two orthogonal directions or the horizontal and vertical directions.

Figure 6:
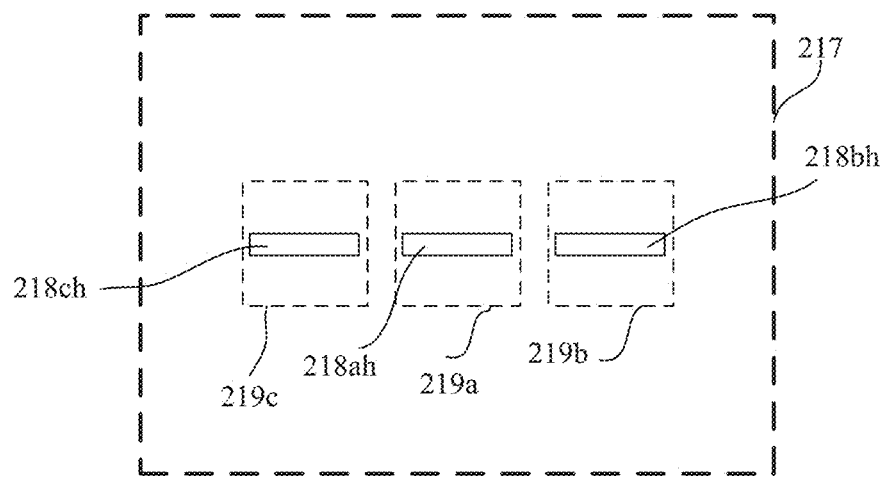
FIG. 6 illustrates a focus detection area according to each embodiment.

FIG. 6 illustrates an illustrative focus detection area in the image capturing range. Both the phase difference AF and TVAF are performed by using signals obtained from the pixels in the focus detection area. In FIG. 6, a rectangle indicated by a thick broken line indicates the image capturing range 217 in which all pixels on the image sensor 122 are formed. Focus detection areas 218*ah*, 218*bh*, and 218*ch* for the phase difference AF are set to the image capturing range 217. Herein, the focus detection areas 218*ah*, 218*bh*, and 218*ch* are set to three positions in total, i.e., the center part of the image capturing range 217 and two or left and right positions. In addition, TVAF focus detection areas 219*a*, 219*b*, and 219*c* are set so as to contain focus detection areas 218*ah*, 218*bh*, and 218*ch* for the phase difference AF, respectively. FIG. 6 merely illustrates an illustrative setting of the focus detection area, and the number, the position, and the size of the focus detection areas are not limited to those illustrated in FIG. 6.

Referring now to the flowchart of FIG. 1, a description will be given of the AF processing in the camera according to this embodiment. The AF processing is mainly executed by the camera MPU 125 according to a focus adjustment control program as a computer program. In some cases, the camera MPU 125 drives and controls the lens unit 100 by sending a command or the like to the lens MPU 117. In the following description, "S" stands for the step.

In S1, the camera MPU 125 sets the focus detection area. Assume that three focus detection areas illustrated in FIG. 6 are set as focus detection areas for the phase difference AF and contrast AF.

In S2, the camera MPU 125 exposes the image sensor 122, reads the image signal, and instructs the image processing circuit 124 to generate the A image signal and the B image signal for the phase difference AF from the image data in the focus detection areas 218*ah*, 218*bh*, and 218*ch* for the phase difference AF. The camera MPU 125 supplies the RAW image data generated by the image processing circuit 124 to the TVAF unit 130, and instructs the TVAF unit 130 to calculate the focus evaluation values based on image data in the focus detection areas 219*a*, 219*b*, and 219*c* for the TVAF. The focus evaluation value calculated by the TVAF unit 130 is stored in the RAM 125*b* in the camera MPU 125.

Next, in S3, the camera MPU 125 determines whether or not the AF auxiliary light (simply referred to as auxiliary light hereinafter) is necessary. In general, for an object with a low illuminance or contrast, the auxiliary light is effective to a good focus detection. Thus, the camera MPU 125 compares the contrast (brightness difference), the average output value, and the like of the A image signal and the B image signal acquired in S2, with predetermined threshold values, and when consequently determining that the contrast or luminance of the object is low, then determines that the auxiliary light is necessary and proceeds to S4. On the other hand, the camera MPU 125 that has determined that the auxiliary light is unnecessary proceeds to S6.

In S4, the camera MPU 125 instructs the auxiliary light to be emitted and the auxiliary light emitter 200 to emit light. At this time, the auxiliary light flag used as a flag for discriminating the emission/non-emission state of the auxiliary light is set to 1 indicating the light emission state.

Next, in S5, the camera MPU 125 re-exposes the image sensor 122, reads the image signal similar to S2, and instructs the image processing circuit 124 to generate the A image signal and the B image signal for the phase difference AF from the image data in the focus detection areas 218*ah*, 218*bh*, and 218*ch* for the phase difference AF. The camera MPU 125 supplies the RAW image data generated by the image processing circuit 124 to the TVAF unit 130, and instructs the TVAF unit 130 to calculate the focus evaluation value from the image data in the TVAF focus detection areas 219*a*, 219*b*, and 219*c*. The focus evaluation value calculated by the TVAF unit 130 is stored in the RAM 125*b* in the camera MPU 125.

In S6, the camera MPU 125 determines whether or not a peak (maximum value) of the reliable focus evaluation value has been detected. When a reliable peak is detected, the camera MPU 125 proceeds to S20 to end the focus detection processing. The reliability of the peak of the focus evaluation value is determined, for example, by comparing each of a difference between the peak and the minimum value of the focus evaluation value, a length of a portion that changes with a slope of a certain value or more in a change curve of the focus evaluation value and a slope of the inclined portion with a corresponding threshold value. If these values exceed all the threshold values, it can be determined that the peak is reliable.

This embodiment uses both the phase difference AF and TVAF. When it is confirmed that an object closer to the near side exists in the same focus detection area or another focus detection area, the flow may proceed to S7 without terminating the focus detection even when a peak of the reliable focus evaluation value is detected. In this case, the focus lens position corresponding to the peak of the reliable focus evaluation value is stored, and when the reliable focus detection result cannot be obtained in the processing after S7, the stored focus lens position is set to the focus detection result.

In S7, the camera MPU 125 calculates a shift amount (phase difference) between the A image signal and the B image signal supplied from the image processing circuit 124 in each of the focus detection areas 218*ch*, 218*ah*, and 218*bh*. Then, the phase difference is converted into a defocus amount using a previously stored conversion. The defocus amount corresponds to the focus detection result.

The camera MPU 125 also determines the reliability of the calculated defocus amount, and uses for the subsequent processing only the defocus amount of the focus detection area which is determined to have the predetermined reliability. As the defocus amount becomes larger by the shielding influence by the lens frame or the like, the phase difference between the A image signal and the B image signal will contain more errors. Thus, when the obtained defocus amount is larger than the threshold, when the coincidence degree of shape between the A image signal and the B image signal is low, and when the A image signal and the B image signal have low contrasts, the reliability of the obtained defocus amount can be determined to be lower than the predetermined reliability. Hereinafter, when it is determined that the obtained defocus amount has a predetermined reliability, it is expressed as a "defocus amount has been successfully calculated." When the defocus amount cannot be calculated for some reasons or when it is determined that the reliability of the defocus amount is low, it is expressed as "defocus amount cannot be calculated."

Next, in S20, the camera MPU 125 calculates the BP correction value. The BP correction value and its calculation processing will be described later. The camera MPU 125 corrects a defocus amount (DEF_B) by the following equation (1) using a calculated BP correction value (BP) to calculate the corrected defocus amount (DEF_A).

$$DEF\_A = DEF\_B + BP \qquad (1)$$

This embodiment calculates the BP correction value using information of the focus lens position representing the maximum value of the defocus MTF in each of six types of spatial frequencies made by combining three colors of R, G, and B and two or longitudinal (vertical) and lateral (horizontal) directions. This configuration can calculate the BP correction value with a higher accuracy because the dependence of the spatial frequency can be considered in color and direction. Thus, the accuracy of AF can be improved.

Next, in S21, the camera MPU 125 selects a focus detection area. This embodiment selects a focus detection area that provides a detection result representing that an object exists on the nearer side. In general, this is because the main object is likely to exist on the near side. However, the method of selecting the focus detection area is not limited, and may use other methods such as preferentially selecting a personal face detection result or the central focus detection area in the image capturing range.

Next, in S22, the camera MPU 125 drives the focus lens 104 through the lens MPU 117 based on the corrected defocus amount DEF_A calculated by the expression (1) for the selected focus detection area.

In S23, the camera MPU 125 instructs non-emission (turning-off) of the auxiliary light. This embodiment turns off the auxiliary light after the movement of the focus lens 104 to the in-focus position is finished, but the turning-off timing is not limited. For example, the auxiliary light may be turned off when a reliable focus detection result is obtained. Thereby, the emission period of the auxiliary light can be shortened, and power saving can be realized. The camera MPU 125 sets the auxiliary light flag used as a flag for discriminating the emission state and the non-emission state of the auxiliary light to 0 indicating the non-emission state.

Subsequently, in S24, the camera MPU 125 displays on the display unit 126 a display (AF frame display) representing a focus detection area used to calculate the defocus amount for driving the focus lens 104. For example, it may be superimposed on a live-view image. Then, the AF processing ends.

Figure 1:
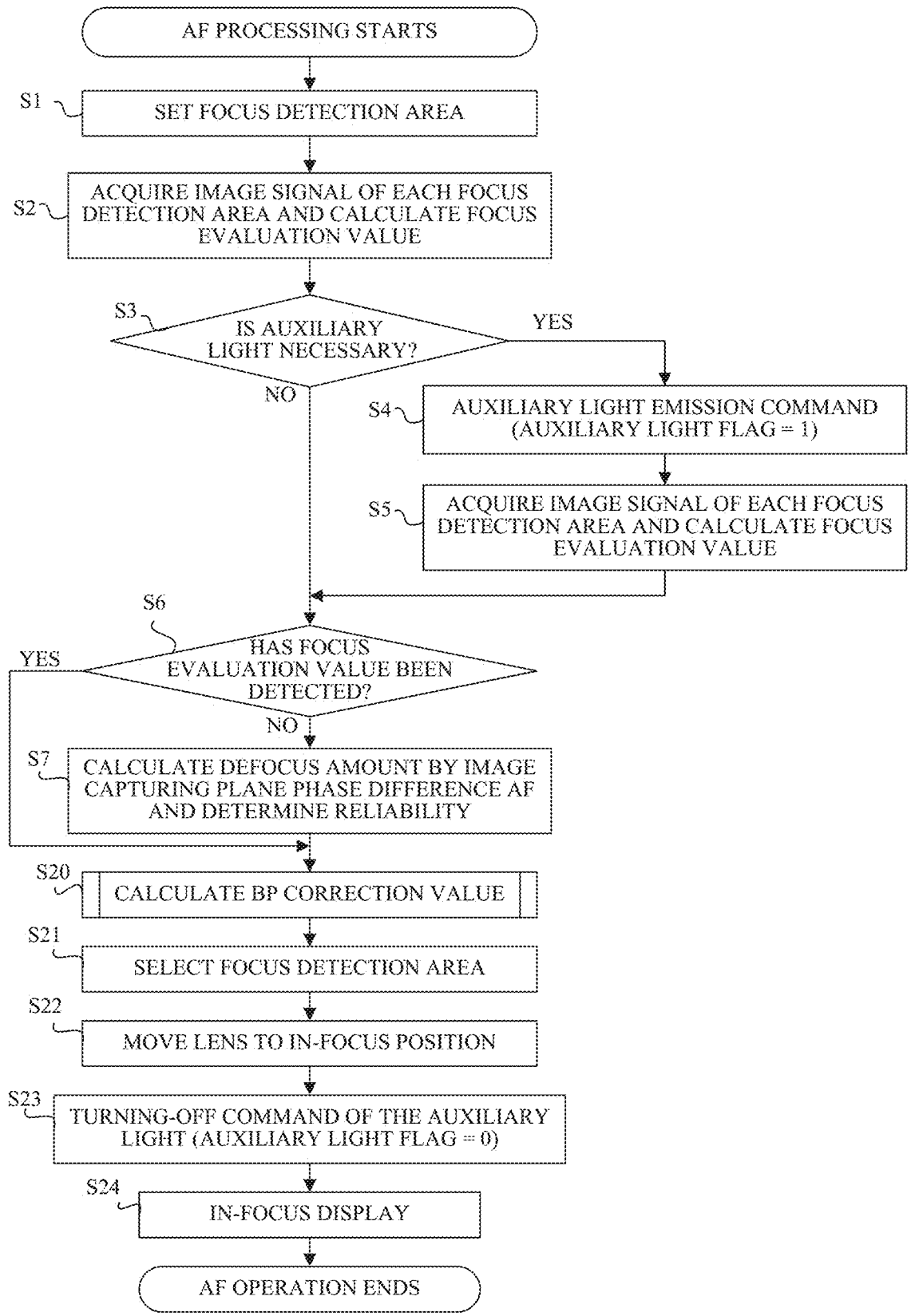
FIG. 1 is a flowchart of AF processing in each embodiment according to the present invention.
Figure 7:
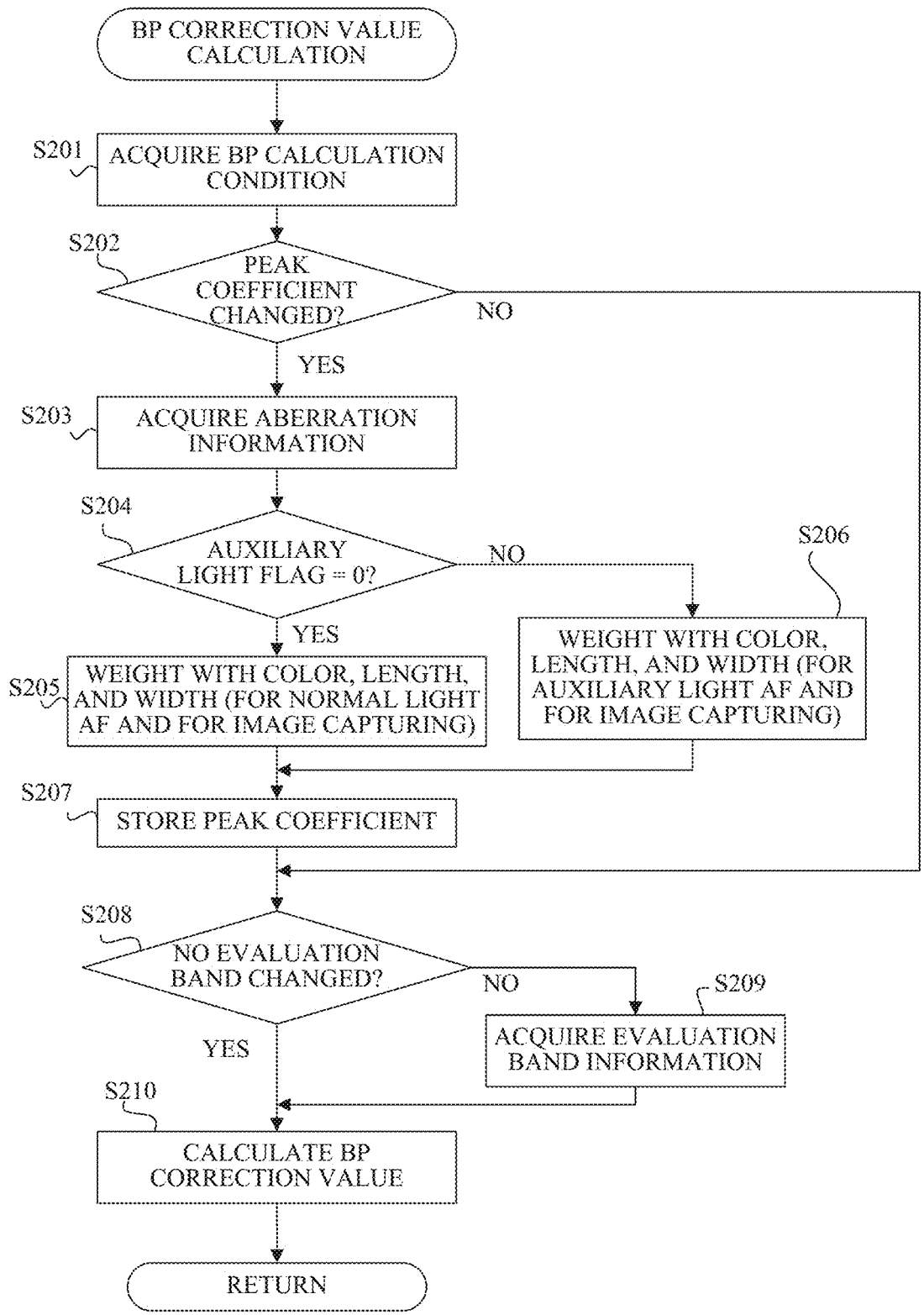
FIG. 7 is a flowchart of BP correction value calculation processing according to a first embodiment.

A flowchart of FIG. 7 illustrates BP correction value calculation processing performed by the camera MPU 125 in S20 in FIG. 1.

In S201, the camera MPU 125 acquires parameters (calculation conditions) necessary to calculate the BP correction value. The BP correction value changes according to the state of the image capturing optical system and the setting of the focus detection system, such as the focus lens position, the position of the first lens unit 101 (referred to as the zoom position hereinafter) indicating the zooming state, and the position of the focus detection area. Thus, the camera MPU 125 acquires, for example, information on the focus lens position, the zoom position, and the position of the focus detection area in S201. The camera MPU 125 acquires setting information (calculation information) on the color and the evaluation direction of the focus detection signal and the captured image generation (recording and imaging) signal in S201. The setting information is stored (saved) in the lens memory 118 or the RAM 125b.

FIG. 8A illustrates the illustrative setting information. This setting information is weighting calculation information indicating the weighting magnitude (coefficient) for each combination of the color (spectroscopic characteristic or wavelength) and the contrast direction (horizontal and vertical directions) used to evaluate the focus state. The setting information differs, between the focus detection and the captured image. The focus detection setting information is different between the AF in a state in which normal light (first light) enters the image capturing optical system and the AF in a state in which the auxiliary light (second light) enters the image capturing optical system. For example, in correcting the TVAF result using the green signal in the horizontal direction under the normal light, the focus detection setting information may be set as follows:

K_AFN_RH=0

K_AFN_GH=1

K_AFN_BH=0

K_AFN_RV=0

K_AFN_GV=0

K_AFN_BV=0

This setting information can express that the peak information of the defocus MTF of the focus detection signal (such as a defocus state in which the defocus MTF has a maximum value as illustrated in FIG. 8B) is the same as the characteristic of the green signal in the horizontal direction.

For example, in correcting the TVAF result mainly using the red signal in the horizontal direction under the auxiliary light, the focus detection setting information may be set as follows:

K_AFL_RH=0.8

K_AFL_GH=0.2

K_AFL_BH=0

K_AFL_RV=0

K_AFL_GV=0

K_AFL_BV=0

This setting information can express that the peak information of the defocus MTF of the focus detection signal is the same as the characteristic of the signal having a center of the red color in the horizontal direction. The set focus detection setting information corresponds to the second calculation information.

On the other hand, the setting information for the captured image is determined as follows:

K_IMG_RH=0.15

K_IMG_GH=0.29

K_IMG_BH=0.06

K_IMG_RV=0.15

K_IMG_GV=0.29

K_IMG_BV=0.06

These values are set on the assumption that weighting used to convert the R, G, and B signals into a signal corresponding to the Y signal is performed, the captured image is evaluated with the Y signal, and both the horizontal and vertical contrasts equally evaluated. However, the set value and the type of set value are not limited. The setting information for the captured image set herein corresponds to the first calculation information.

Similar to a change of the setting information for the focus detection based on whether or not the auxiliary light is emitted, the setting information for the captured image may be switched depending on whether or not the flash light is emitted.

Next, in S202, the camera MPU 125 determines whether or not there is a change in a peak coefficient described later. This determination is made in order to omit the recalculation of the peak coefficient when a variety of conditions are the same between the previously calculating the BP correction value and the currently calculating the BP correction value. In this embodiment, the camera MPU 125 determines that there is no change in the peak coefficient if the setting information (FIG. 8A) for the color and evaluation direction for the focus detection and the captured image and the position of the focus detection area do not change, and proceeds to S208 without S203 to S207.

On the other hand, when the peak coefficient is calculated for the first time in S202 or when it is determined that the peak coefficient changes, the camera MPU 125 proceeds to S203 and acquires the aberration information. The aberration information is information on the imaging position in the image capturing optical system for each spatial frequency of the object or information on the aberration, and information on the focus lens position that provides a maximum value (peak) of the defocus MTF (referred to as defocus MTF peak position hereinafter) in this embodiment. The aberration information is expressed by the following expression (2) having as variables the spatial frequency f and the position (x, y) of the focus detection area on the image sensor 122 for each of the above six combinations of three colors and two directions:

$$MTF\_P\_RH(f,x,y)=(rh(0)\times x+rh(1)\times y+rh(2))\times f2+(rh(3)\times x+rh(4)\times y+rh(5))\times f+(rh(6)\times x+rh(7)\times y+rh(8)) \quad (2)$$

The expression (2) indicates an expression of the defocus MTF peak position MTF_P_RH for each spatial frequency corresponding to the horizontal (H) direction for the R color signal, but a similar expression can express a defocus MTF peak position for each spatial frequency in combination of other colors and directions.

This embodiment previously stores rh(n) (1≤n≤8) in the lens memory 118 in the lens unit 100, and the camera MPU 125 requests the lens MPU 117 for rh(n). Alternatively, rh(n) may be stored in the nonvolatile area in the camera RAM 125b.

Coefficients (rv, gh, gv, bh, and bv) can be similarly obtained for each combination of the red and vertical direction (MTF_P_RV), the green and horizontal direction (MTF_P_GH), the green and vertical direction (MTF_P_GV), the blue and horizontal direction (MTF_P_BH), and the blue and vertical direction (MTF_P_BV). This embodiment refers to a curve illustrated in FIG. 8B as an MTF peak curve.

Next, in S204, the camera MPU 125 determines whether the auxiliary light is in the non-emission state (auxiliary light flag=0) or the light emission state (auxiliary light flag=1). The flow proceeds to S205 in the light emission state, and the flow proceeds to S206 in the non-emission state.

In S205, the camera MPU 125 weights the obtained aberration information with the position of the focus detection area and the color and contrast direction of the signal to be evaluated. First, the camera MPU 125 calculates the aberration information by using information on the position of the focus detection area in calculating the BP correction value. More specifically, the position information of the focus detection area is substituted for x and y in the expression (2). The expression (2) is expressed by this calculation in the form of the following expression (3).

$$\text{MTF\_P\_RH}(f) = Arh \times f2 + Brh \times f + Crh \quad (3)$$

The camera MPU 125 similarly calculates MTF_P_RV(f), MTF_P_GH(f), MTF_P_GV(f), MTF_P_BH(f), and MTF_P_BV(f).

FIG. 8B illustrates illustrative aberration information after the position information of the focus detection area is substituted in S205, where the abscissa axis represents the spatial frequency and the ordinate axis represents the defocus MTF peak position. Nq represents a Nyquist frequency determined by the pixel pitch in the image sensor 122.

As illustrated, a curve for each color deviates in a high chromatic aberration, and illustrated horizontal and vertical curves deviate when the longitudinal and lateral difference is large. Thus, this embodiment has information on the defocus MTF corresponding to the spatial frequency for each combination of colors (R, G and B) and evaluation directions (H and V). This configuration can calculate the BP correction value with a high accuracy.

Next, the camera MPU 125 weights twelve coefficients (FIG. 8A) in the setting information acquired in S201 by using aberration information. Thereby, the setting information is weighted with colors and directions to be evaluated in the focus detection and imaging. More specifically, the camera MPU 125 calculates the MTF peak curve MTF_P_AF(f) indicating the spatial frequency characteristic for the focus detection and the MTF peak curve MTF_P_Img(f) indicating the spatial frequency characteristic for the captured image by using the expressions (4) and (5).

$$\text{MTF\_P\_AF}(f) = \text{K\_AF\_RH} \times \text{MTF\_P\_RH}(f) + \text{K\_AF\_RV} \times \text{MTF\_P\_RV}(f) + \text{K\_AF\_GH} \times \text{MTF\_P\_GH}(f) + \text{K\_AF\_GV} \times \text{MTF\_P\_GV}(f) + \text{K\_AF\_BH} \times \text{MTFP\_BH}(f) + \text{K\_AF\_BV} \times \text{MTF\_P\_BV}(f) \quad (4)$$

$$\text{MTF\_P\_Img}(f) = \text{K\_IMG\_RH} \times \text{MTF\_P\_RH}(f) + \text{K\_IMG\_RV} \times \text{MTF\_P\_RV}(f) + \text{K\_IMG\_GH} \times \text{MTF\_P\_GH}(f) + \text{K\_IMG\_GV} \times \text{MTF\_P\_GV}(f) + \text{K\_IMG\_BH} \times \text{MTF\_P\_BH}(f) + \text{K\_IMG\_BV} \times \text{MTF\_P\_BV}(f) \quad (5)$$

In the expression (4), K_AF_RH, K_AF_GH, K_AF_BH, K_AF_RV, K_AF_GV, and K_AF_BV are weighting coefficients for the focus detection (AF). K_AFN_RH, K_AFN_GH, K_AFN_BH, K_AFN_RV, K_AFN_GV, and K_AFN_BV, which are weighting coefficients for the AF under the normal light (referred to as normal light AF hereinafter), are used as the AF weighting coefficients.

FIG. 8C illustrates illustrative MTF_P_AF(f) and MTF_P_Img(f) in the same format as that in FIG. 8B. This embodiment calculates the variables of the position of the focus detection area and the color and direction to be evaluated before calculating the variable of the spatial frequency. As a result of the calculation, MTF_P_AF(f) and MTF_P_Img(f) are expressed by the following expressions (6) and (7).

$$\text{MTF\_P\_AF}(f) = Aaf \times f2 + Baf \times f + Caf \quad (6)$$

$$\text{MTF\_P\_Img}(f) = Aimg \times f2 + Bimg \times f + Cimg \quad (7)$$

FIG. 8C illustrates the defocus MTF peak positions LP4_AF, LP5_AF, LP6_AF, and LP7_AF obtained by substituting the discrete spatial frequencies F1 to F4 for the expression (6) on the ordinate axis.

In S206, similar to S205, the camera MPU 125 weights the obtained aberration information with the position of the focus detection area and the color and direction of the signal to be evaluated. S206 is different from S205 in using weighting coefficients (K_AF_RH to K_AF_BV) for the AF under the auxiliary light (referred to as auxiliary light AF hereinafter) for AF weighting coefficients (K_AFL_RH to K_AFL_BV). The MTF peak curve MTF_P_AF(f) can be properly calculated indicating the focus detection spatial frequency characteristic for each situation by changing the AF weighting coefficient between the ordinary light and the auxiliary light. This configuration can highly accurately correct the focus detection result regardless of whether or not the auxiliary light is emitted.

In S207, the camera MPU 125 stores LP4_AF to LP7_AF (or LP4_AFL to LP7_AFL) as peak coefficients MTF_P_AF (n) (1≤n≤4) in the lens memory 118 or the RAM 125b. The camera MPU 125 stores as the peak coefficients MTF_P_Img(n) LP4_Img to LP7_Img in the lens memory 118 or the RAM 125b, and proceeds to S208.

Next, in S208, the camera MPU 125 determines whether or not there is a change in the evaluation band of the signal for the focus detection or the captured image. When there is no change in the evaluation band, the flow proceeds to S210 to calculate the BP correction value. In calculating the BP correction value, the camera MPU 125 first calculates the in-focus position (P_img) of the captured image and the focus position (P_AF) detected with the AF and the following expressions (8) and (9). In this calculation, the camera MPU 125 uses the evaluation band W1 indicating the captured image evaluation band and the evaluation band W2 indicating the AF evaluation band. The captured image evaluation band and the AF evaluation band are spatial frequency bands in evaluating a signal for generating a captured image and a signal for performing the AF.

The camera MPU 125 calculates the captured image evaluation band based on the object, the image capturing optical system, the frequency characteristic of the image sensor, and the influence on the evaluation band of the viewer for the captured image. In addition, the camera MPU 125 calculates the AF evaluation band based on the object, the image capturing optical system, the sampling frequency of the image sensor, and the influence of the digital filter used for the evaluation. A detailed description of these two evaluation band calculating methods will be given later.

$$P\_img = MTF\_P\_Img(1) \times W1(1) + MTF\_P\_Img(2) \times W1(2) + MTF\_P\_Img(3) \times W1(3) + MTF\_P\_Img(4) \times W1(4) \quad (8)$$

$$P\_AF = MTF\_P\_AF(1) \times W2(1) + MTF\_P\_AF(2) \times W2(2) + MTF\_P\_AF(3) \times W2(3 + MTF\_P\_AF(4) \times W2(4) \quad (9)$$

In other words, the camera MPU 125 weights and adds information of the maximum value of the defocus MTF for each spatial frequency illustrated in FIG. 8C with the captured image and the AF evaluation bands W1 and W2. This configuration calculates the in-focus position P_AF detected at the in-focus position P_img and AF (in the focus detection) of the captured image (in image capturing). The in-focus position of the captured image corresponds to the first focus position, the in-focus position detected with the AF (normal light AF and auxiliary light AF) corresponds to the second focus position.

Next, the camera MPU 125 calculates the BP correction value (BP) by the following expression (10).

$$BP = P\_AF - P\_img \quad (10)$$

Due to the above processing, the camera MPU 125 calculates BP correction values that is different between the normal light AF and the auxiliary light AF.

The camera MPU 125 that has determined that there is a change in the evaluation band in S208 acquires and updates the evaluation band information in S209. When the evaluation band is acquired, the camera MPU 125 proceeds to S210 and calculates the BP correction value as described above.

Referring now to FIGS. 9A to 9F, a description will be given of a method of calculating a captured image evaluation band and an AF evaluation band. Each of these figures illustrates the intensity of a signal for each spatial frequency, where the abscissa axis represents the spatial frequency, and the ordinate axis represents the intensity.

Figure 9A:
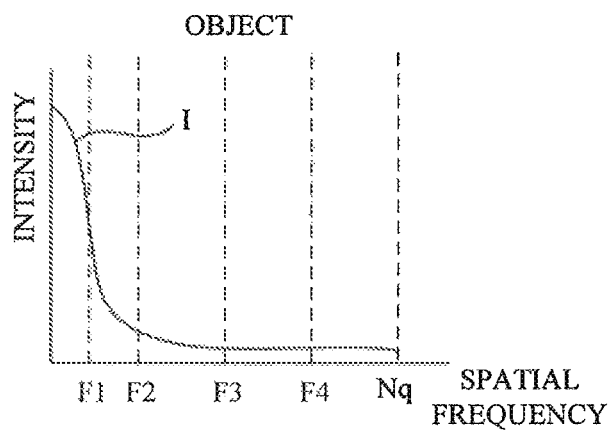
FIGS. 9A to 9F illustrate spatial frequency characteristics according to the first embodiment.

FIG. 9A illustrates the spatial frequency characteristic I of the object. F1, F2, F3, and F4 on the abscissa axis represent the spatial frequencies corresponding to the MTF peak curve in FIG. 8B. Nq is a Nyquist frequency determined by a pixel pitch of the image sensor 122. FIGS. 9B to 9F similarly illustrate F1 to F4 and Nq. This embodiment uses a previously stored representative value for the spatial frequency characteristic (I) of the object. FIG. 9A draws the spatial frequency characteristic (I) of the object as a continuous curve but, in practice, has discrete values I(n)(1) corresponding to the spatial frequencies F1, F2, F3, and F4 (1≤n≤4).

While this embodiment uses the previously stored representative value for the spatial frequency characteristic of the object, the spatial frequency characteristic of the object to be used may be changed according to the object for which the focus detection is performed. The spatial frequency information (power spectrum) of the object can be obtained by FFT processing or the like on the image data obtained by image capturing. The calculation processing load increases, but the correction value can be calculated according to the actually focus-detected object and the focus state can be more accurately detected. Simply, a number of types of previously stored spatial frequency characteristics may be differently used depending on the magnitude of the contrast information of the object.

Figure 9B:
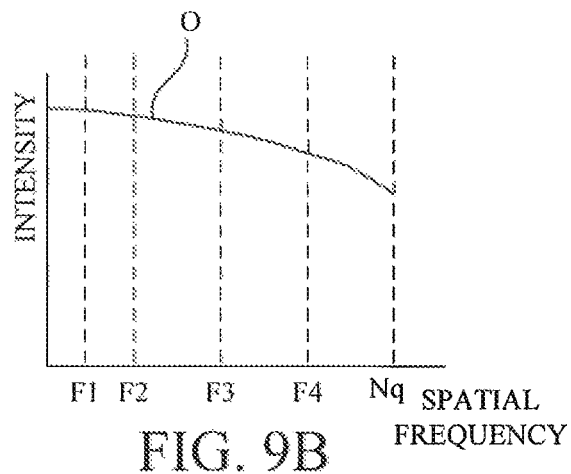

FIG. 9B illustrates the spatial frequency characteristic O of the image capturing optical system. Information on the spatial frequency characteristic O may be acquired from the lens MPU 117 or stored in the RAM 125*b* in the camera. The information to be stored may be the spatial frequency characteristic for each defocus state or only the spatial frequency characteristic in the in-focus state. The BP correction value is calculated near the in-focus position and a highly accurate BP correction value can be obtained by using the spatial frequency characteristic in the in-focus state. A more accurate BP correction value can be obtained when a spatial frequency characteristic for each defocus state is used even if the calculation load becomes heavier. Which defocus state of the spatial frequency characteristic is used may be determined based on the defocus amount obtained by the phase difference AF. FIG. 9B illustrates the spatial frequency characteristic O of the image capturing optical system as a continuous curve, but it actually has the discrete value O(n) (1≤n≤4) corresponding to the spatial frequencies F1, F2, F3, and F4.

Figure 9C:
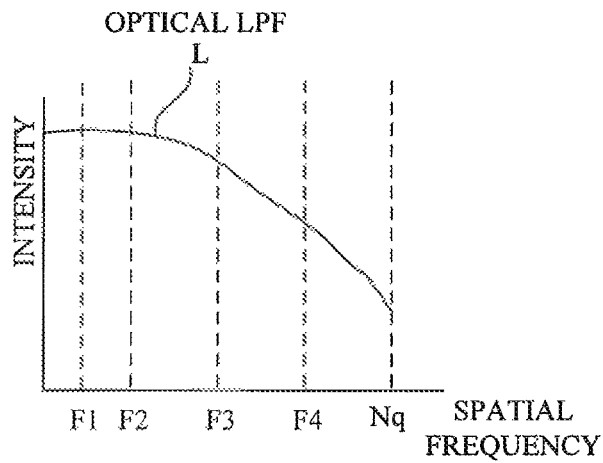

FIG. 9C illustrates the spatial frequency characteristic L of the optical low-pass filter 121. Information on this spatial frequency characteristic L is stored in the RAM 125*b* in the camera. FIG. 9C illustrates the spatial frequency characteristic (L) of the optical low-pass filter 121 as a continuous curve, but it actually has the discrete value L(n) (1≤n≤4) corresponding to the spatial frequencies F1, F2, F3, and F4.

Figure 9D:
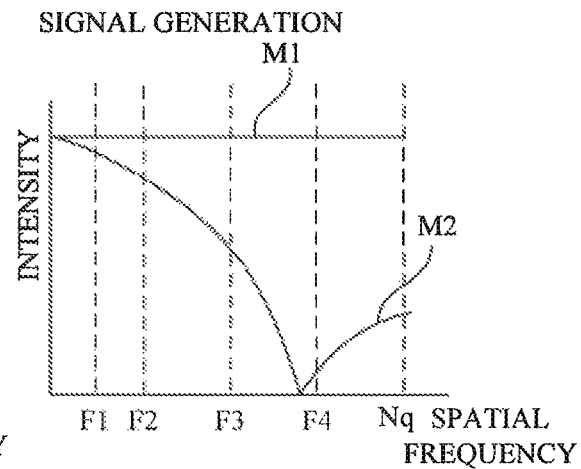

FIG. 9D illustrates the spatial frequency characteristics M1 and M2 due to the signal generation. As described above, the image sensor according to this embodiment has two types of read modes. In the first read mode or the all (or full) pixel read mode, the spatial frequency characteristic does not change in the signal generation as shown by the spatial frequency characteristic M1. In the second read mode or the thinning read mode, the spatial frequency characteristic changes in the signal generation as shown by the spatial frequency characteristic M2. In the second read mode, a signal is added in thinning in the X direction to improve the S/N and a low-pass effect occurs due to the addition. M2 in FIG. 9D shows the spatial frequency characteristic in the signal generation in the second read mode. Herein, the thinning influence is not considered, and only the low-pass effect is shown by the addition. FIG. 9D illustrates the spatial frequency characteristics M1 and M2 due to the signal generation as continuous curves, but they actually have the discrete values M1(*n*) and M2(*n*) corresponding to the spatial frequencies F1, F2, F3, and F4 (1≤n≤4).

Figure 9E:
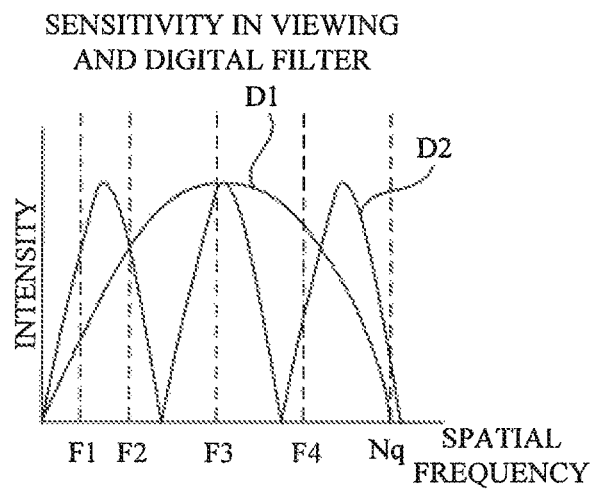

FIG. 9E illustrates the spatial frequency characteristic D1 showing the sensitivity for each spatial frequency when the captured image is viewed and the spatial frequency characteristic D2 of the digital filter used to process the AF evaluation signal. The sensitivity for each spatial frequency when the captured image is viewed depends on individual differences among viewers, viewing environments such as an image size, a viewing distance, and the brightness. This embodiment sets and stores the sensitivity for each spatial frequency in viewing as a representative value.

In the second read mode, the folding noise (aliasing) of the frequency component of the signal occurs due to the thinning effect. The spatial frequency characteristic D2 is the spatial frequency characteristic of the digital filter based on the influence. FIG. 9E illustrates curves of the spatial frequency characteristic D1 in viewing and the spatial frequency characteristic D2 of the digital filter, but they actually have discrete values D1(*n*) and D2(*n*) corresponding to the spatial frequencies F1, F2, F3, and F4 (1≤n≤4).

By previously storing the various spatial frequency characteristics as described above, the captured image evaluation band W1 as the imaging characteristic information and the AF evaluation band W2 as the focus detection characteristic information are expressed by the following expressions (11) and (12). In the expressions (11) and (12), n is $1 \leq n \leq 4$.

$$W1(n)I(n) \times O(n) \times L(n) \times M1(n) \times D1(n) \quad (11)$$

$$W2(n)=I(n) \times O(n) \times L(n) \times M2(n) \times D2(n) \quad (12)$$

Figure 9F:
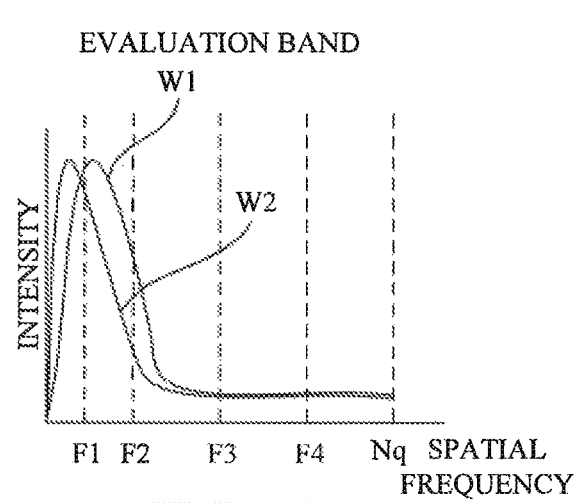

FIG. 9F illustrates the captured image evaluation band W1 and the AF evaluation band W2. Calculating the equations (11) and (12) can quantify the influence degree of each spatial frequency for a determinant of the in-focus state of the captured image. Similarly, the influence degree of the error in the focus detection result for each spatial frequency can be quantified.

The information stored in the camera may be previously calculated W1 or W2. Due to a calculation for each correction as described above, the correction value can be calculated so as to flexibly handle a change of the digital filter or the like used for the AF evaluation. Once it is previously stored, the memory capacity of calculations of the expressions (11) and (12) and various data can be reduced.

Since it is unnecessary to complete all calculations beforehand, for example, only the spatial frequency characteristics of the image capturing optical system and the object are previously calculated and stored in the camera so as to reduce the data memory capacity and the calculation amount.

FIGS. 9A to 9F describe discrete values corresponding to four spatial frequencies (F1 to F4). However, the larger the number of spatial frequencies having data, the more accurately the spatial frequency characteristics of the captured image evaluation band and the AF evaluation band can be reproduced and the highly accurately the BP correction value can be calculated. Reducing the spatial frequency to be weighted can reduce the calculation load. The following calculation may be performed with spatial frequencies with representative spatial frequency characteristics of the captured image evaluation band and the AF evaluation band.

This embodiment changes the weighting coefficient for the focus detection (information for second calculation) according to whether or not the auxiliary light is emitted, and calculates the MTF peak curve MTF_P_AF(f) indicating the spatial frequency characteristic. This configuration can weight the focus detection signal suitable for the color (spectroscopic characteristic) of the auxiliary light when the auxiliary light is emitted, and can highly accurately correct the focus detection result. The information necessary to emit the auxiliary light is only the information of the weighting coefficient corresponding to the color of the auxiliary light, and new aberration information and the like are unnecessary. Thus, even when the number of types of corresponding auxiliary light increases, highly accurate corrections can be provided without excessively increasing an information amount necessary to correct the focus detection result.

Variation

This embodiment changes the weighting coefficient for the focus detection only depending on whether or not the auxiliary light is emitted, and calculates the MTF peak curve MTF_P_AF(f) showing the spatial frequency characteristic for the focus detection. This variation assumes that the object has a constant spectroscopic characteristic, but the actual object has a variety of spectroscopic characteristics.

When the auxiliary light is emitted, it is assumable that the light source other than the auxiliary light is dark and that there is no influence of the spectroscopic characteristic of the object by the light source other than the auxiliary light. In addition to this assumption, the spectroscopic characteristic of the object can be acquired by previously storing information of the spectroscopic characteristic of the auxiliary light. Assume that Ir, Ig, and Ib are spectroscopic characteristics (second object spectroscopic information) of the object in three colors (wavelengths) of red, green, and blue, Lr, Lg, and Lb are spectroscopic characteristics (light quantity ratios) of the auxiliary light, and Or, Og, and Ob are spectroscopic characteristics (signal intensity ratio: first object spectroscopic information) of the output signal from the image sensor 122 when the auxiliary light is emitted. At this time, the spectroscopic characteristics Ir, Ig, and Ib of the object can be calculated by the following expression (13).

$$Ir=Or/Lr$$

$$Ig=Og/Lg$$

$$Ib=Ob/Lb \quad (13)$$

The spectroscopic characteristics Ir, Ig, and Ib of the object represent the characteristics obtained by subtracting the spectroscopic characteristic of the auxiliary light from the light quantity received by the image sensor 122.

The setting information indicating the weighting magnitudes for the captured image, the normal light AF, and the auxiliary light AF may be changed based on the information of the spectroscopic characteristic of the object (first object spectroscopic information) obtained from the output signal of the image sensor 122 when the auxiliary light is emitted. Thereby, the focus detection result can be highly accurately corrected. For example, the setting information for the captured image may be set as follows:

K_IMG_RH=Ir

K_IMG_GH=Ig

K_IMG_BH=Ib

K_IMG_RV=Ir

K_IMG_GV=Ig

K_IMG_BV=Ib (where Ir+Ig+IB=0.5)

Similarly, the setting information for the auxiliary light AF may be sot as follows:

K_AFL_RH=Or/(Or+Og)

K_AFL_GH=Og/(Or+Og)

K_AFL_BH=0

K_AFL_RV=0

K_AFL_GV=0

K_AFL_BV=0

The setting information for the normal light AF may use the spectroscopic characteristic (Ir, Ig, Ib) of the obtained object.

The camera MPU 125 as the object spectral calculator performs the above processing and can calculate the BP correction value based on the spectroscopic characteristic of the object.

Second Embodiment

Next follows a description of a second embodiment according to the present invention. This embodiment discusses a plurality of types of auxiliary light. The first embodiment has limited the type of auxiliary light to one, and changes the weighting coefficient for the focus detection depending on whether or not to emit the auxiliary light. However, the auxiliary light contains various types of light such as red, green, orange, infrared, and white, which have different spectroscopic characteristics from one another. This embodiment corrects the focus detection result according to the spectroscopic characteristic of the auxiliary light, thereby highly accurately detecting the focus state regardless of the type of auxiliary light.

The camera configuration (FIG. 2), the focus detection method (FIGS. 3A to 5), the focus detection area (FIG. 6) and each evaluation band (FIGS. 9A to 9F) described in the first embodiment are common to this embodiment.

Figure 10:
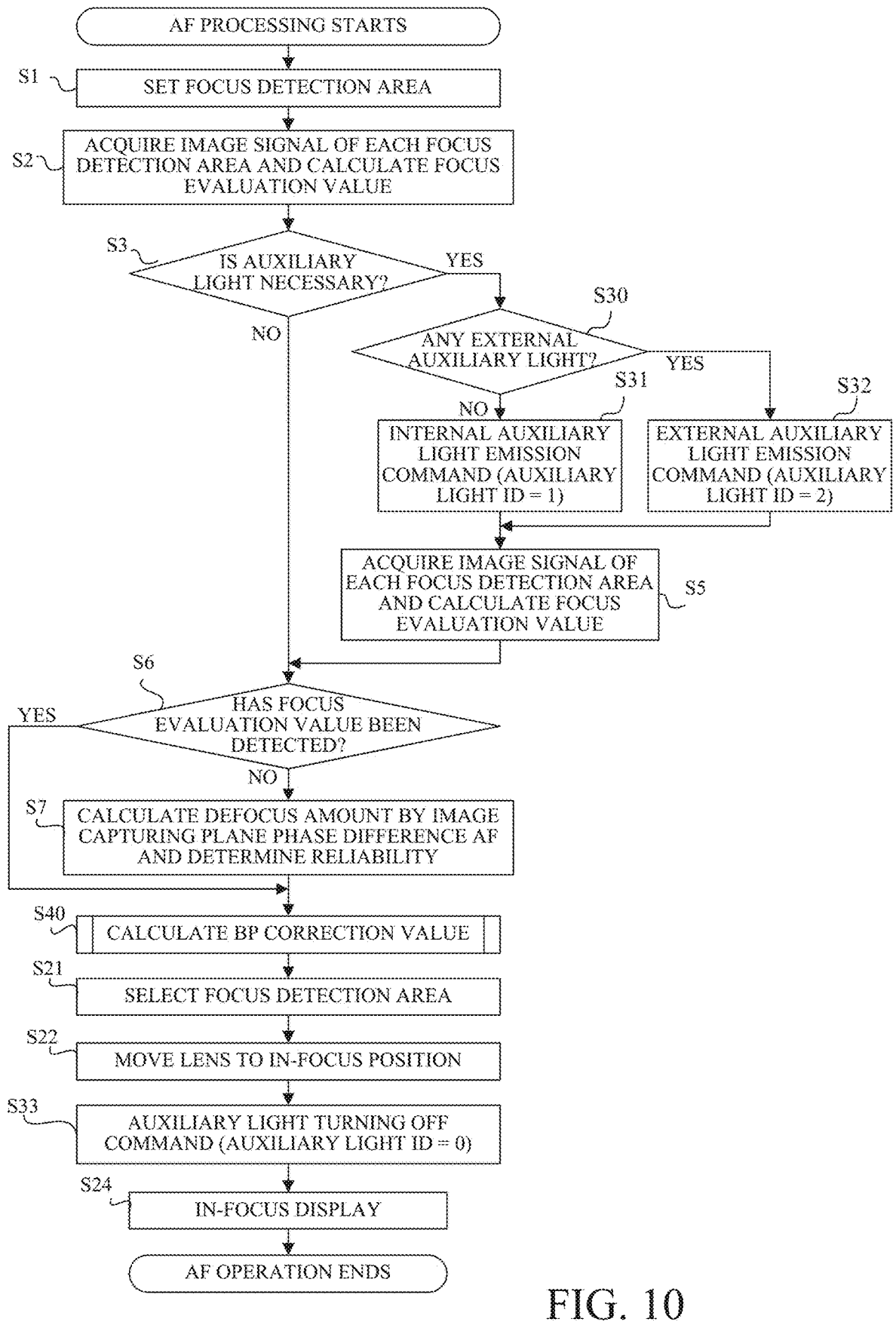
FIG. 10 is a flowchart of AF processing according to a second embodiment.
Figure 11:
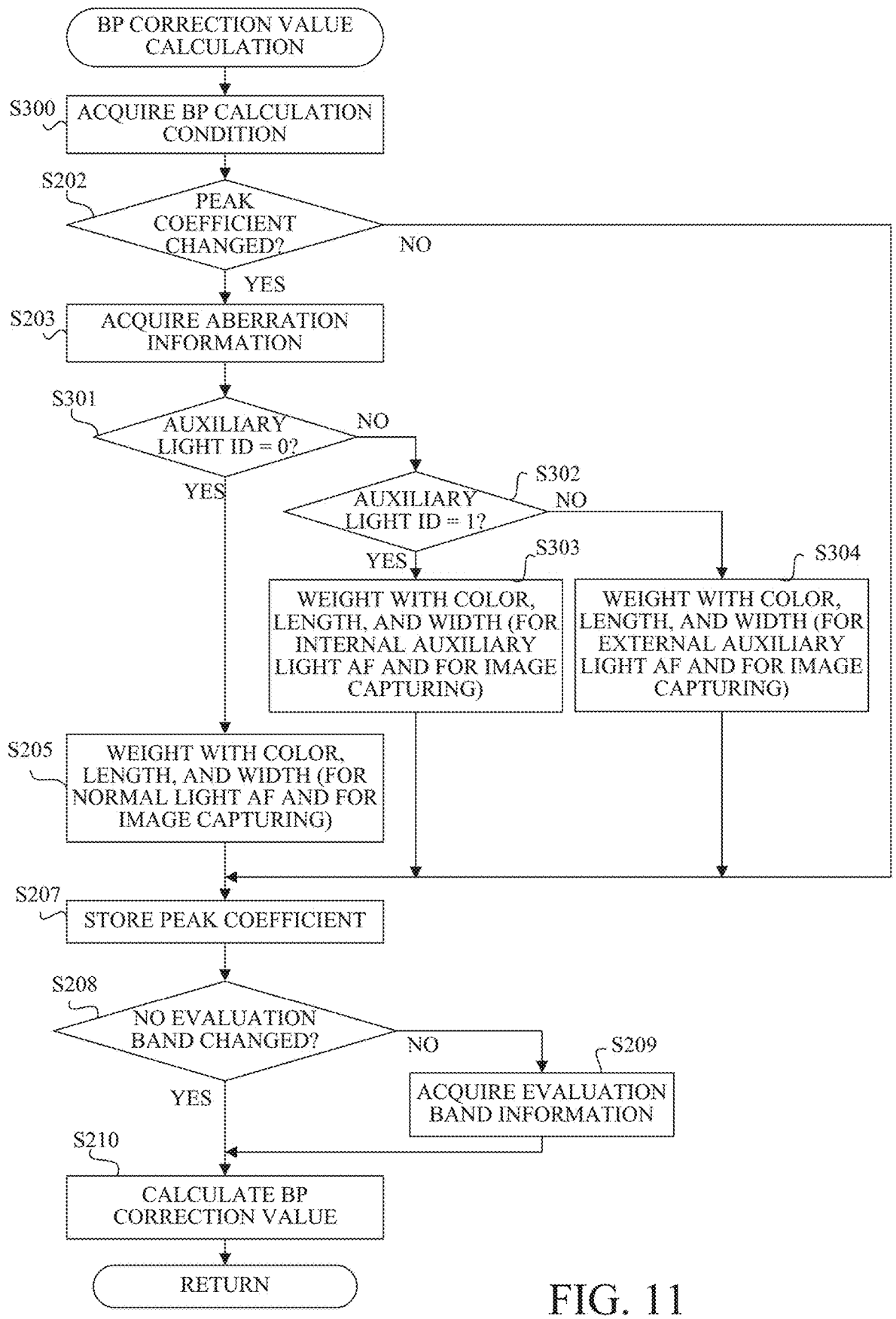
FIG. 11 is a flowchart of BP correction value calculation processing according to the second embodiment.

Referring now to FIGS. 10 to 12, a description will be given of the AF processing according to this embodiment. In the flowchart in FIG. 10, those steps which are corresponding steps in the AF processing (FIG. 1) according to the first embodiment will be designated by the same reference numerals as those in the first embodiment.

In the flowchart in FIG. 10, when the auxiliary light is necessary (Yes in S3), the usable auxiliary light differs from the first embodiment in that there are two types of auxiliary light or internal (built-in) auxiliary light and external auxiliary light. The internal auxiliary light is emitted from the auxiliary light emitter 200 illustrated in FIG. 2 in the first embodiment. The external auxiliary light is emitted from an external auxiliary light emitter provided in an external flash unit that is attachable to the camera main body 120. In this embodiment, the internal auxiliary light has a spectroscopic characteristic with a center of green, and the external auxiliary light has a spectroscopic characteristic with a center of infrared to red.

In S3, the camera MPU 125 that has determined that the auxiliary light is necessary proceeds to S30 and determines whether or not there is an external auxiliary light emitter or whether or not the external auxiliary light can be emitted. If the external auxiliary light cannot be emitted, the camera MPU 125 proceeds to S31 and instructs the internal auxiliary light to emit. At this time, the camera MPU 125 sets the auxiliary light ID used as the ID for determining the emission/non-emission of the internal auxiliary light to 1 indicating the light emission state.

If the external auxiliary light can be emitted, the camera MPU 125 proceeds to S32 and instructs the emission of the external auxiliary light. Then, the camera MPU 125 sets the auxiliary light ID used as the ID for discriminating the light emission state of the external auxiliary light to 2 indicating the light emission state. This embodiment assumes that the spectroscopic characteristic of the external auxiliary light is known, but information on the spectroscopic characteristic may be acquired from the external flash unit. The camera MPU 125 may acquire information indicating the spectroscopic characteristic from the external flash unit or information on the type of the external auxiliary light, and set a predetermined auxiliary light ID according to the information.

The camera MPU 125 that has finished emitting the auxiliary light in S31 and S32 proceeds to S5 and continues the processing. The subsequent processing is the same as that in the first embodiment. When S7 ends or in case of Yes in S6, the camera MPU 125 proceeds to S40 and performs BP correction. A detailed description will be given of the BP correction later.

The camera MPU 125 that has finished S22 performs S33 that is the same processing as S23. At this time, the camera MPU 125 sets the auxiliary light ID used as the ID for discriminating the non-emission state of the auxiliary light to 0 indicating the non-emission state.

Referring now to a flowchart of FIG. 11, a description will be given of the details of the BP correction value calculation processing according to this embodiment. In FIG. 11, those steps which are corresponding to the steps in the first embodiment (FIG. 7) will be designated by the same step numerals.

In S300, the camera MPU 125 acquires a parameter (calculation condition) necessary to calculate the BP correction value. The BP correction value changes according to the state of the image capturing optical system and the setting of the focus detection system, such as the focus lens position, the zoom position, and the position of the focus detection area. Thus, the camera MPU 125 acquires for example, information on the focus lens position, the zoom position, and the position of the focus detection area in S300. In S300, the camera MPU 125 acquires the setting information on the color and the evaluation direction of the focus detection signal and the captured image generation signal.

FIG. 12 illustrates illustrative setting information. This setting information represents the weighting magnitude for each combination of the colors (R, G, and B) for evaluating the focus state and the contrast direction (horizontal and vertical directions). The setting information differs between focus detection and captured image. The setting information for the focus detection is different among the normal light AF, the internal auxiliary light AF, and the external auxiliary light AF. The setting information for the normal light AF is the same as that in the first embodiment. The setting information for the internal auxiliary light AF may be set as follows since the internal auxiliary light mainly has a green spectroscopic characteristic:

$K\_AFLin\_RH=0.2$ $K\_AFLin\_GH=0.7$ $K\_AFLin\_BH=0.1$ $K\_AFLin\_RV=0$ $K\_AFLin\_GV=0$ $K\_AFLin\_BV=0$

This setting information indicates that the defocus MTF peak information for the focus detection signal is the same as the mainly green signal characteristic in the horizontal direction.

The setting information of the external auxiliary light AF may be set as follows, since the external auxiliary light has mainly infrared to red spectroscopic characteristics:

$K\_AFLout\_RH=0.9$ $K\_AFLout\_GH=0.1$ $K\_AFlout\_BH=0$

K_AFLout_RV=0

K_AFlout_GV=0

K_AFLout_BV=0

This setting information indicates that the peak information of the defocus MTF for the focus detection signal is the same as the mainly red signal characteristic in the horizontal direction. Even when other auxiliary light exists, the weight for each color may be set according to the spectroscopic characteristics.

While this embodiment has discussed a light emission by switching a plurality of auxiliary light beams having different spectroscopic characteristics, a plurality of auxiliary light beams may be simultaneously emitted. Then, weighting information for these auxiliary light beams may be set based on the intensity and spectroscopic characteristic of each auxiliary light. For example, when an intensity ratio between the internal auxiliary light and the external auxiliary light in this embodiment is 1:2 and they are simultaneously emitted, a use weighting coefficient may be set by a weighting addition of the weighting coefficients (K_AFLin and K_AFout) of the internal auxiliary light and the external auxiliary light with a ratio of 1:2.

In S301, the camera MPU 125 that has finished S203 determines whether the auxiliary light ID is 0 or whether the auxiliary light is in a non-emission state. If the auxiliary light ID is in the non-emission state, the processing proceeds to S205. In the light emission state, the camera MPU 125 proceeds to S302 and determines whether the auxiliary light ID is 1 or 2 or whether the internal auxiliary light is in the light emission state or the external auxiliary light is in the light emission state. If the internal auxiliary light is in the light emission state, the camera MPU 125 proceeds to S303, and when the external auxiliary light is in the emission state, the camera MPU 125 proceeds to S304.

In S303 and S304, the camera MPU 125 uses the weighting coefficient for the auxiliary light AF acquired in S300, similar to S205 and S206 in the first embodiment, and performs weighting with the position of the focus detection area and the color and the contrast direction of the signal to be evaluated. The AF weighting coefficients are K_AF_RH, K_AF_GH, K_AF_BH, K_AF_RV, K_AF_GV, and K_AF_BV. These AF weighting coefficients may use weighting coefficients for the internal auxiliary light AF (K_AFLin_RH, K_AFLin_GH, K_AFLin_BH, K_AFLin_RV, K_AFLin_GV, and K_AFLin_BV) in S 303. In S304, the AF weighting coefficients may use weighting coefficients for the external auxiliary light AF (K_AFLout_RH, K_AFLout_GH, K_AFLout_BH, K_AFLout_RV, K_AFLout_GV, and K_AFLout_BV).

Third Embodiment

Next follows a third embodiment according to the present invention. This embodiment discusses a (for example, infrared) spectroscopic characteristic of the auxiliary light outside the spectroscopic characteristic range of the RGB color filters in the image sensor. The second embodiment calculated the BP correction value by changing weights for R, G and B according to the spectroscopic characteristic of each of the plurality of auxiliary light beams. However, the BP correction amount cannot be calculated only by changing weights for R, G and B in case of the auxiliary light having a (for example, infrared) spectroscopic characteristic outside the wavelength ranges of R, G, and B. Saving the infrared weighting coefficient increases a memory capacity in the lens memory 118 or the RAM 125b. This embodiment calculates the BP correction amount in emitting the infrared auxiliary light without increasing a necessary memory capacity.

Therefore, this embodiment calculates the BP correction amount for the infrared auxiliary light AF by the extrapolation operation using the weighting coefficients for the normal light AF of R, G, and B (second calculation information).

The camera configuration (FIG. 2), the focus detection method (FIGS. 3A to 5), the focus detection area (FIG. 6), and the evaluation bands (FIGS. 9A to 9F) described in the first embodiment are common to this embodiment.

Figure 13:
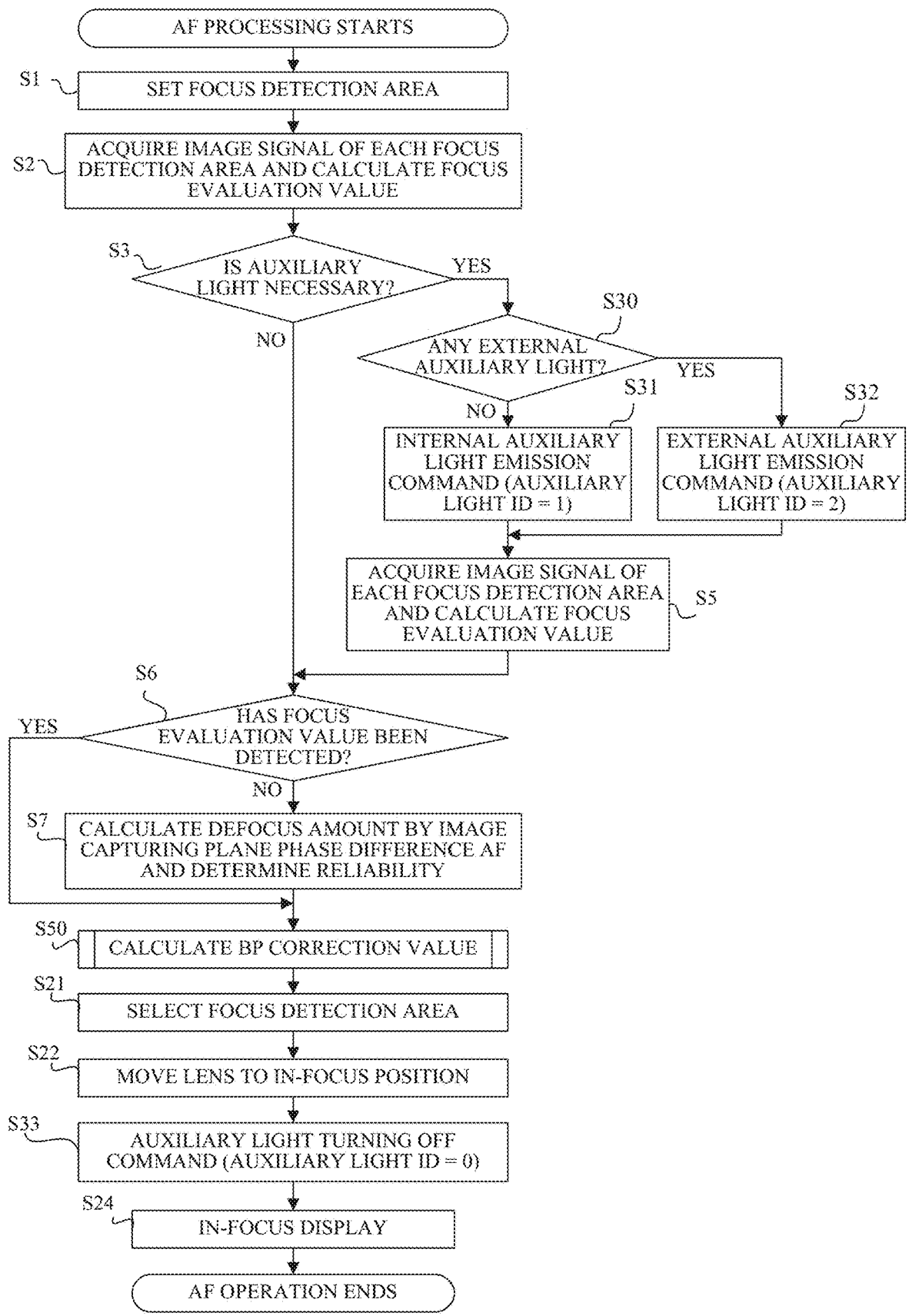
FIG. 13 is a flowchart illustrating AF processing according to a third embodiment.
Figure 14:
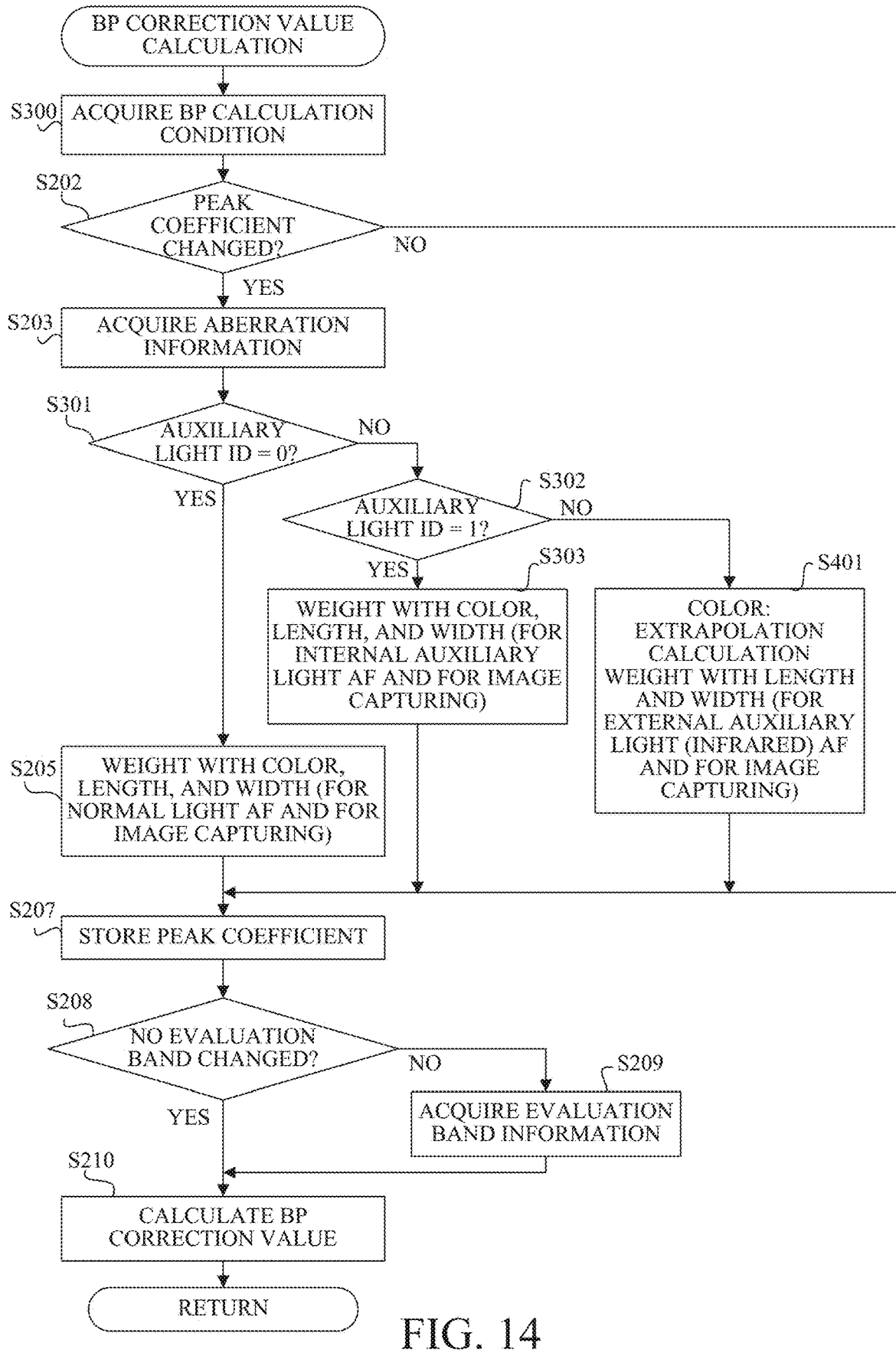
FIG. 14 is a flowchart of the BP correction value calculation processing according to the third embodiment.
Figure 15:
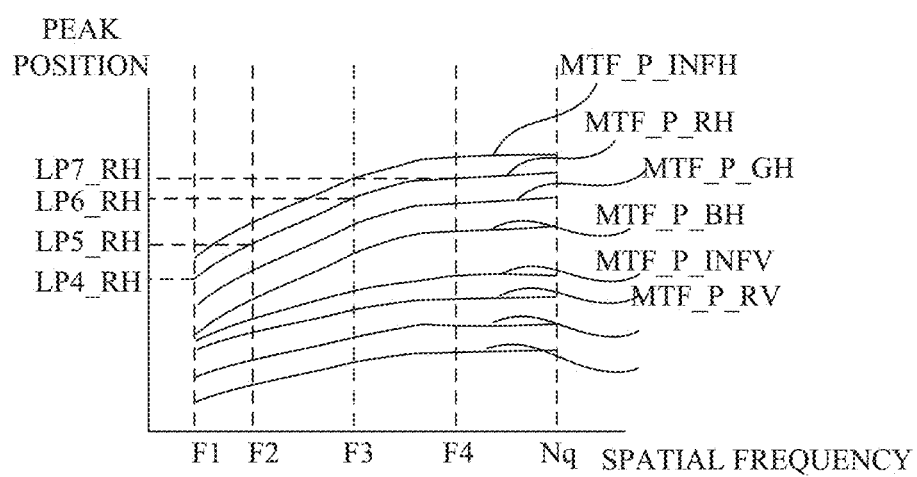
FIG. 15 explains BP correction value calculation processing according to the third embodiment.

Referring now to FIGS. 13 to 15, a description will be given of the AF processing according to this embodiment. This embodiment discusses the external auxiliary light as infrared light. In the flowchart of FIG. 13, those steps which are corresponding steps in the AF processing (FIG. 10) in the second embodiment will be designated by the same step numerals. This embodiment is different from the second embodiment only in the BP correction value calculation processing performed in S50.

Referring now to a flowchart of FIG. 14, a description will be given of the BP correction value calculation processing performed by the camera MPU 125 in S50. In FIG. 14, those steps which are corresponding steps in the second embodiment (FIG. 11) will be designated by the same step numerals. In this embodiment, in S401 instead of S304 in the second embodiment, the camera MPU 125 weights the aberration information when the external infrared auxiliary light is emitted.

FIG. 15 adds MTF peak curves of the infrared and horizontal direction (MTF_P_INFH) and the infrared and vertical direction (MTF_P_INFV) to the MTF peak curve illustrated in FIG. 8B.

In step S401, the camera MPU 125 calculates MTF_P_INFH(f) and MTF_P_INFV(f) by using the following equations (14) and (15). The expressions (14) and (15) show the extrapolation operation using the MTF peak curves (aberration information) of R and G and the weighting coefficient for the normal light AF of R (second calculation information).

$$\text{MTF\_P\_INFH}(f)=\text{K\_AF\_RH}\times(\text{MTF\_P\_RH}(f)+ \\ (\text{MTF\_P\_RH}(f)-\text{MTF\_P\_GH}(f)) \quad (14)$$

$$\text{MTF\_P\_INFV}(f)=\text{K\_AF\_RV}\times(\text{MTF\_P\_RV}(f)+ \\ (\text{MTF\_P\_RV}(f)-\text{MTF\_P\_GV}(f)) \quad (15)$$

The camera MPU 125 calculates the MTF peak curve MTF_P_AF_INF(f) indicating the spatial frequency characteristic for the focus detection using the following equation (16).

$$\text{MTF\_P\_AF\_INF}(f)=\text{K\_AF\_INFH}\times\text{MTF\_P\_INFH}(f)+ \\ \text{K\_AF\_INFV}\times\text{MTF\_P\_INFV}(f)+\text{K\_AF\_RH}\times \\ \text{MTF\_P\_RH}(f)+\text{K\_AF\_RV}\times\text{MTF\_P\_RV}(f)+ \\ \text{K\_AF\_GH}\times\text{MTF\_P\_GH}(f)\text{K\_AF\_GV}\times \\ \text{MTF\_P\_GV}(f)+\text{K\_AF\_BH}\times\text{MTF\_P\_BH}(f)+ \\ \text{K\_AF\_BV}\times\text{MTF\_P\_BV}(f) \quad (16)$$

The setting for the normal light AF may be similar to that in the first embodiment. The setting information of the weighting coefficient for the external auxiliary light is set as follows, since the external auxiliary light has mainly infrared spectroscopic characteristic.

K_AF_INFH=1

K_AF_RH=0

K_AF_GH=0

K_AF_BH=0

K_AF_INFV=0

K_AF_RV=0

K_AF_GV=0

K_AF_BV=0

This setting information of the weighting coefficients can indicate that the peak information of the defocus MTF of the signal used for the focus detection is the same as the mainly infrared signal characteristic in the horizontal direction.

The camera MPU 125 calculates the MTF peak curve for the external (infrared) auxiliary light AF, as shown in the equations (14) and (15), through the extrapolation calculation using the MTF peak curve (aberration information) for the normal light and the weighting coefficient (the second calculation information) for the normal light AF. Then, the camera MPU 125 calculates the in-focus position (third focal position) detected by the infrared auxiliary light AF by using this MTF peak curve and calculates a difference as the BP correction value between the in-focus position (first focal position) for the captured image and the in-focus position detected by the infrared auxiliary light AF. This configuration can calculate the BP correction value in the emission of the external infrared auxiliary light without increasing the memory capacity while storing the weighting coefficients for R, G, and B.

Variation

This variation calculated the infrared MTF peak curve MTF_P_INF(f) by the extrapolation operation using the MTF peak curves for the focus detection of R and G according to whether the external infrared auxiliary light is emitted. This variation assumes that the object has a constant spectroscopic characteristic. However, the actual object has various spectroscopic characteristics, and the received light signal of the image sensor 122 in the emission of the external auxiliary light is a mixture of the light signal intensity from the object and the signal intensity of the external auxiliary light and thus it is necessary to change setting information for the external auxiliary light.

Assume that Sr, Sg, and Sb are the spectroscopic characteristics (signal intensity ratios) of the signals of three colors (wavelengths) of R, G, and B received by the image sensor 122 from the arbitrary object when the auxiliary light is not emitted. Also, assume that Lr, Lg, and Lb are spectroscopic characteristics (light amount ratios) of three colors (wavelengths) of R, G, and B of the external auxiliary light.

Then, when Sr/Sg≥Lr/Lg, the signal strength in the R wavelength is large and thus the signal intensity of the external auxiliary light is larger than that of the light from the object. Then, the MTF peak curve MTF_P_AF_INF(f) is calculated by increasing the value of the weighting coefficient K_AF_INFH to, for example, 1. On the other hand, where Sr/Sg<Lr/Lg, the signal intensity of the external auxiliary light is smaller than that of the light from the object. Then, the MTF peak curve MTF_P_AF_INF(f) is calculated by reducing the value of the weighting coefficient K_AF_INFH and weighting R, G and B.

While this embodiment discusses the calculation of the BP correction value when the infrared auxiliary light is emitted, any wavelengths other than the three colors (wavelengths) of R, G, and B may be used.

Fourth Embodiment

Next follows a fourth embodiment according to the present invention. This embodiment stores the G and B weighting coefficients, and an infrared weighting coefficient instead of the R weighting coefficient. That is, this embodiment stores a weighting coefficient for light in part of a wavelength range of the first light (R, G and B), and a weighting coefficient for the second light (infrared) having a wavelength range different from that of the first light. As a result, the infrared region longer than R can be weighted without increasing the memory capacity. While the third embodiment calculated the infrared characteristic by the extrapolation calculation, the extrapolation calculation is difficult to guarantee accuracy and thus this embodiment uses the infrared aberration information instead of R. The R aberration information is calculated by the interpolation calculation.

The camera configuration (FIG. 2), the focus detection method (FIGS. 3A to 5), the focus detection area (FIG. 6), and the evaluation bands (FIGS. 9A to 9F) described in the first embodiment are common to this embodiment.

Figure 16:
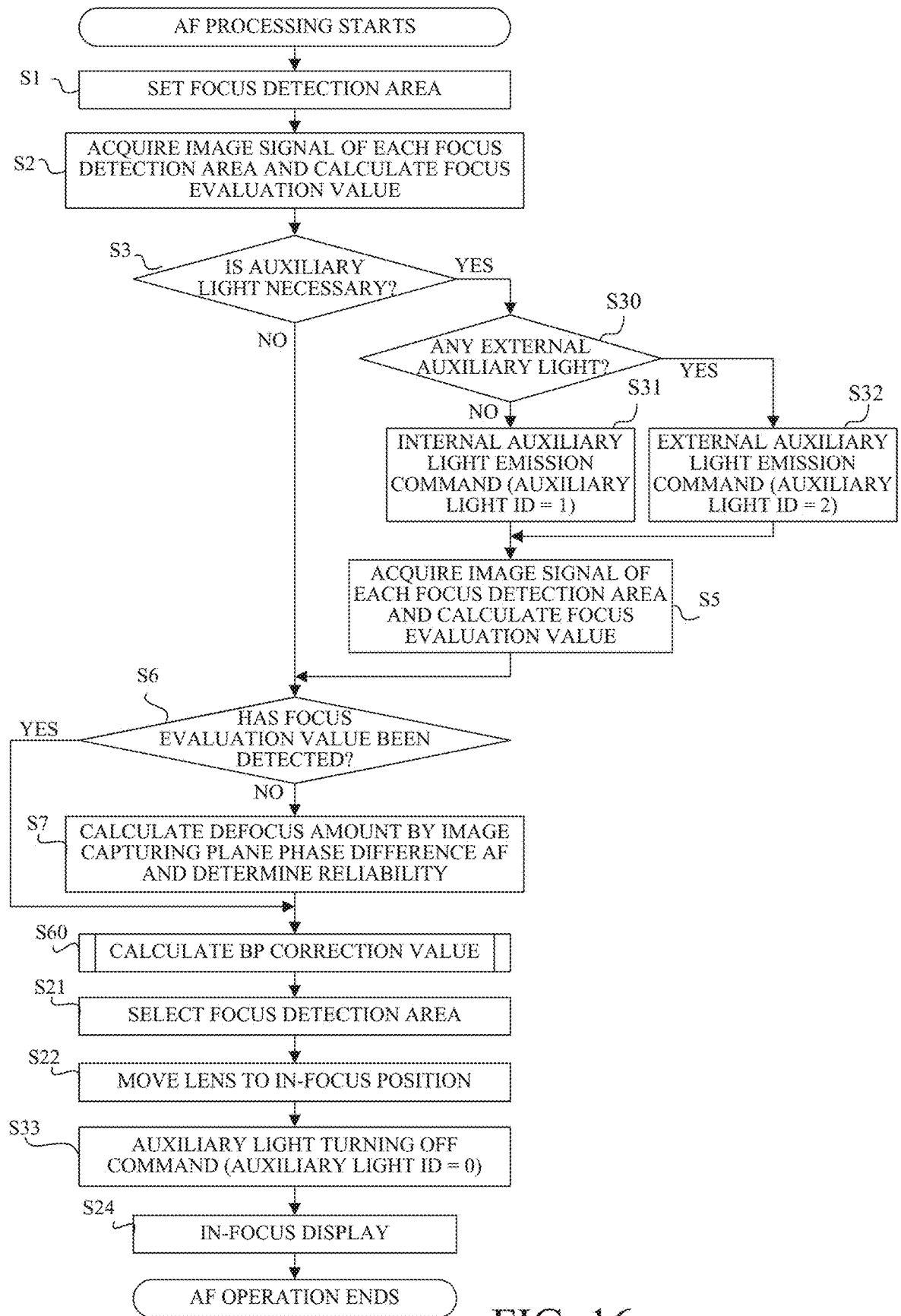
FIG. 16 is a flowchart of AF processing according to a fourth embodiment.

Referring now to FIGS. 16 to 19, a description will be given of the AF processing according to this embodiment. This embodiment discusses the external infrared auxiliary light. In the flowchart of FIG. 16, those steps which are corresponding steps in the AF processing (FIG. 10) in the second embodiment will be designated by the same step numerals. This embodiment is different from the second embodiment only in the BP correction value calculation processing performed in S60.

Figure 17:
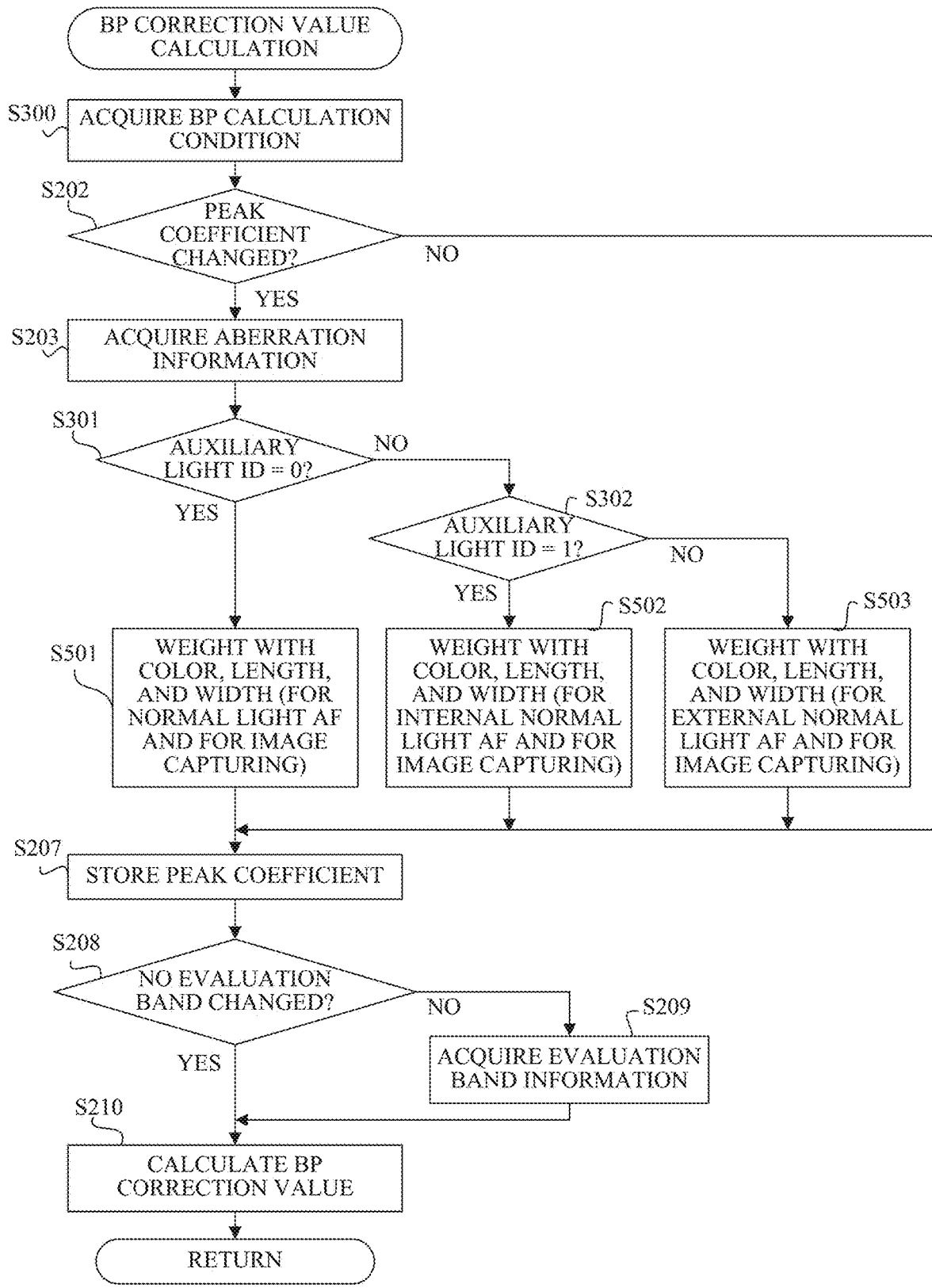
FIG. 17 is a flowchart of BP correction value calculation processing according to the fourth embodiment.

Referring now to the flowchart of FIG. 17, a description will be given of the BP correction value calculation processing performed by the camera MPU 125 in S60. In FIG. 17, those steps which are corresponding steps in the second embodiment (FIG. 11) will be designated by the same step numerals. In this embodiment, in S501 instead of S205 in the second embodiment (first embodiment), the camera MPU 125 weights the aberration information for the normal light AF. In S502 instead of S303 in the second embodiment, the camera MPU 125 weights the internal auxiliary light AF. In S503 instead of S304 in the second embodiment, the camera MPU 125 weights the external auxiliary light AF.

FIG. 18 adds an infrared and horizontal MTF peak curve (MTF_P_INFH) and an infrared and vertical MTF peak curve (MTF_P_INFV) to the MTF peak curve illustrated in FIG. 8B. The red and horizontal and vertical MTF peak curves have been deleted.

In step S501, the camera MPU 125 calculates the MTF peak curve MTF_P_AF_INF 2(f) indicating the spatial frequency characteristic for the focus detection using the following equation (17). The MTF peak curve MTF_P_Img_INF 2(f) indicating the spatial frequency characteristic for the captured image is calculated using the following equation (18).

$$\begin{aligned}\text{MTF\_P\_AF\_INF2}(f) = &\ \text{K\_AF\_INFH} \times \text{MTF\_P\_INFH}(f) \\ &+ \text{K\_AF\_INFV} \times \text{MTF\_P\_INFV}(f) + \text{K\_AF\_GH} \\ &\times \text{MTF\_P\_GH}(f) + \text{K\_AF\_GV} \times \text{MTF\_P\_GV}(f) \\ &+ \text{K\_AF\_BH} \times \text{MTF\_P\_BH}(f) + \text{K\_AF\_BV} \\ &\times \text{MTF\_P\_BV}(f)\end{aligned} \quad (17)$$

$$\begin{aligned}\text{MTF\_P\_Img\_INF2}(f) = &\ \text{K\_IMG\_INFH} \times \text{MTF\_P\_INFH}(f) \\ &+ \text{K\_IMG\_INFV} \times \text{MTF\_P\_INFV}(f) \\ &+ \text{K\_IMG\_GH} \times \text{MTF\_P\_GH}(f) + \text{K\_IMG\_GV} \\ &\times \text{MTF\_P\_GV}(f) + \text{K\_IMG\_BH} \times \text{MTF\_P\_BH}(f) \\ &+ \text{K\_IMG\_BV} \times \text{MTF\_P\_BV}(f)\end{aligned} \quad (18)$$

K_AF_INFH and K_AF_INFH are setting information in which the contrast direction for evaluating the infrared focus state is horizontal and vertical, respectively. Storing the infrared setting information can calculate the MTF peak curves of the normal light, the internal auxiliary light, and the infrared external auxiliary light by the interpolation calculation without increasing the memory capacity.

FIG. 19 illustrates illustrative setting information about the color and the evaluation direction of the focus detection signal and the captured image generation signal in this embodiment. This setting information indicates the weighting magnitude for each combination of the colors (R, G, and B) and the contrast direction (horizontal and vertical) for evaluating the focus state. The setting information differs between the focus detection and the captured image. The setting information for the focus detection is different among the normal light AF, the internal auxiliary light AF, and the external auxiliary light AF.

Variation

This embodiment obtains the infrared MTF peak curve MTF_P_INF(f) by the extrapolation operation using the R and G MTF peak curves for the focus detection and a result of whether the external infrared auxiliary light is emitted or not. This assumes that the object has a constant spectroscopic characteristic. However, the actual object has various spectroscopic characteristics, and the received light signal of the image sensor 122 in the emission of the external auxiliary light is a mixture of the signal intensity of the light from the object and the signal intensity of the external auxiliary light and thus it is necessary to change setting information for the external auxiliary light.

Assume that Sr, Sg, and Sb are the spectroscopic characteristics (signal intensity ratios of the signals of three colors wavelengths) of R, G, and B received by the image sensor 122 from an arbitrary object when the auxiliary light is not emitted. Also, assume that Lr, Lg, and Lb are spectroscopic characteristics (light amount ratios) of three colors (wavelengths) of R, G, and B of the external auxiliary light. Where Sr/Sg≥Lr/Lg, the signal strength in the R wavelength is large and thus the signal intensity of the external auxiliary light is larger than that of the light from the object. Then, the MTF peak curve MTF_P_AF_INF 2(f) is calculated by increasing the value of the weighting coefficient K_AF_INFH. On the other hand, where Sr/Sg<Lr/Lg, the signal intensity of the external auxiliary light is smaller than that of the light from the object. Then, the MTF peak curve MTF_P_AF_INF2(f) is calculated by reducing the value of the weighting coefficient K_AF_INFH and weighting R, G and B.

Fifth Embodiment

Next follows a fifth embodiment according to the present invention. This embodiment provides a calculation when auxiliary light is emitted, by using aberration information suitable for the color of the auxiliary light and a weighting coefficient of the focus detection signal. The camera configuration (FIG. 2), the focus detection method (FIGS. 3A to 5), the focus detection area (FIG. 6), and the evaluation bands (FIGS. 9A to 9F) described in the first embodiment are common to this embodiment.

Figure 20:
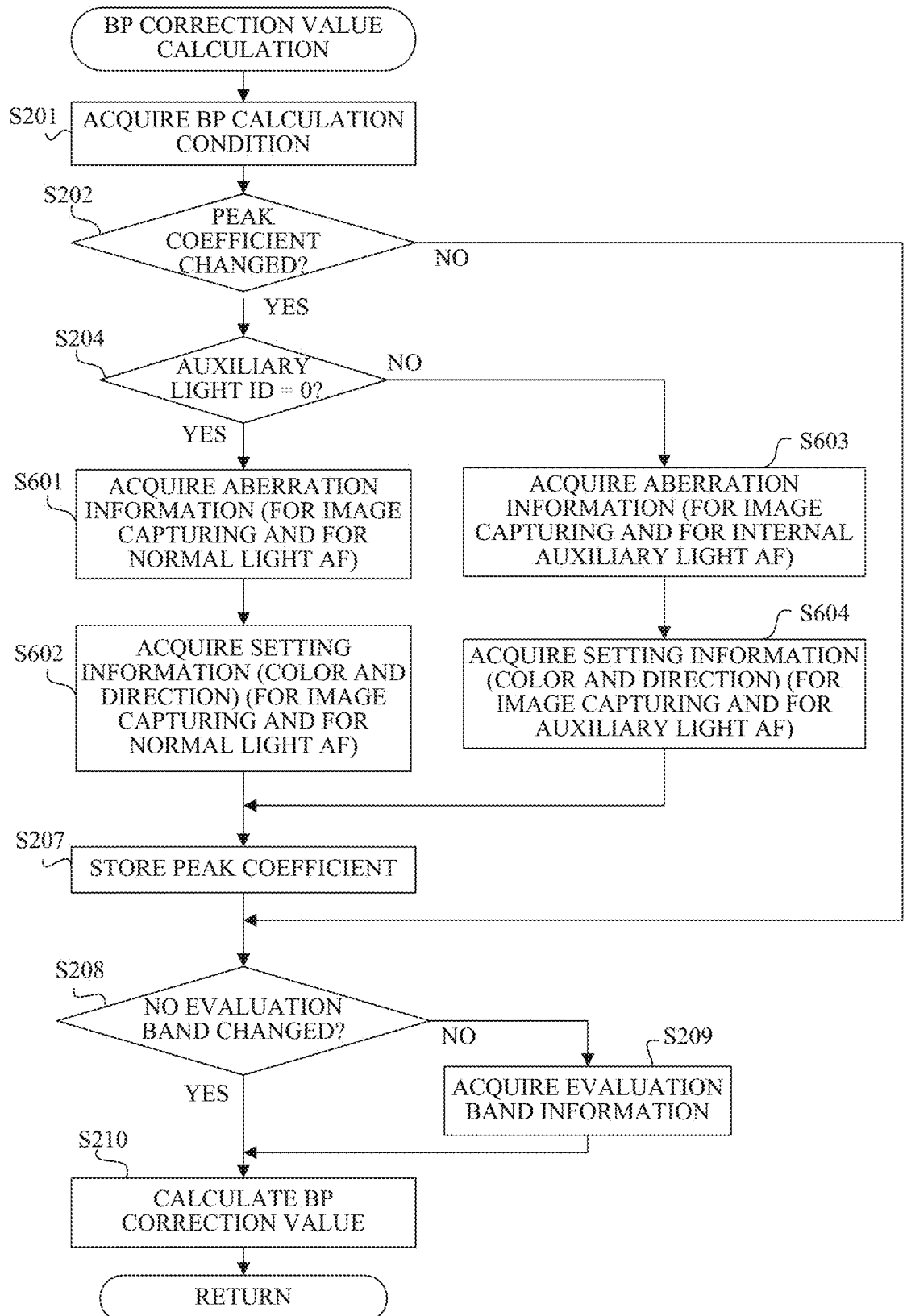
FIG. 20 is a flowchart of BP correction value calculation processing according to a fifth embodiment.

Referring now to FIGS. 20 and 21A to 21C, a description will be given of the BP correction value calculation processing according to this embodiment. This embodiment discusses the near-infrared auxiliary light. In the flowchart of FIG. 20, those steps which are corresponding steps in the BP correction value calculation processing (FIG. 7) in the first embodiment will be designated by the same step numerals.

In step S201, the camera MPU 125 acquires information on the focus lens position, the zoom position, and the position of the focus detection area necessary to calculate the BP correction value. The camera MPU 125 acquires the signal used for the focus detection and the setting information on the color and the evaluation direction of the signal used to generate the captured image.

FIG. 21A illustrates illustrative setting information. This setting information indicates the weighting magnitude for each combination of the colors (near infrared, R, G and B) for evaluating the focus state and the direction of contrast (horizontal and vertical). The setting information differs between the focus detection and the captured image. The setting information for the focus detection has different information between the normal light AF and the auxiliary light AF. In this embodiment, the auxiliary light has a different color between the horizontal direction and the vertical direction. In the horizontal direction, there are four colors of near-infrared, R, G, and B, and in the vertical direction, there are three colors of R, G, and B. For example, in correcting the result of the contrast AF using the G signal in the horizontal direction under the normal light, the setting information for the focus detection is set as follows:

K_AFN_RH=0

K_AFN_GH=1

K_AFN_BH=0

K_AFN_RV=0

K_AFN_GV=0

K_AFN_BV=0

This setting information indicates that the peak information of the defocus MTF of the focus detection signal is the same as the characteristic of the G signal in the horizontal direction. The setting information for the focus detection set herein corresponds to the second calculation information.

For example, the setting information for the focus detection is set as follows in correcting the result of the contrast AF mainly using the G signal in the horizontal direction under the auxiliary light:

K_AFL_NIRH=0.7

K_AFL_RH=0.2

K_AFL_GH=0.1

K_AFL_BH=0

K_AFL_RV=0

K_AFL_GV=0

K_AFL_BV=0

This setting information indicates that the peak information of the defocus MTF of the focus detection signal is the same as the characteristic of the signal with a center of R and near-infrared in the horizontal direction. The focus detection setting information set herein corresponds to the third calculation information.

On the other hand, the setting information for the captured image may be set as follows:

K_IMG_RH=0.15

K_IMG_GH=0.29

K_IMG_BH=0.06

K_IMG_RV=0.15

K_IMG_GV=0.29

K_IMG_BV=0.06

These values are set on the assumption that the weights for converting the R, G and B signals into the Y signal are performed, the captured image is evaluated with the Y signal, and both the horizontal and vertical contrasts are evaluated equally. The set value and its type are not limited. The setting information for the captured image set herein corresponds to the first calculation information.

Similar to a change of the setting information for the focus detection based on whether or not the auxiliary light is emitted, the setting information for the captured image may be switched depending on whether the flash light is emitted or not.

The camera MPU 125 that has determined a change in the peak coefficient in S202 proceeds to S204 and determines whether the auxiliary light is in the non-emission state (auxiliary light flag=0) or the light emission state (auxiliary light flag=1). The flow proceeds to S601 in the non-emission state, and the flow proceeds to S603 in the light emission state.

In S601, the camera MPU 125 acquires first aberration information that is aberration information in the non-emission state of the auxiliary light. The aberration information is information at the imaging position of the image capturing optical system for each spatial frequency of the object. As described in the first embodiment, the aberration information is expressed by the expression (2) with variables of the spatial frequency f and the position (x, y) of the focus detection area on the image sensor 122 for each of the above six combinations of three colors and two directions. The camera MPU 125 acquires the first aberration information for the red and horizontal direction (MTF_P_RH), the red and vertical direction (MTF_P_RV), the green and horizontal direction (MTF_P_GH), the green and vertical direction (MTF_P_GV), the blue and horizontal direction (MTF_P_BH), and the blue and vertical direction (MTF_P_BV). In addition, coefficients (rv, gh, gv, bh, and bv) in these combinations are also stored and obtained. This embodiment refers to the curve shown in FIG. 21B as an MTF peak curve.

In step S602, the camera MPU 125 acquires setting information for weighting the aberration information obtained in step S601 with the position of the focus detection area and the color and the contrast direction of the signal to be evaluated. The setting information acquired herein corresponds to the first calculation information for recording and imaging and the second calculation information for the normal light AF.

First, the camera MPU 125 calculates aberration information using the position information of the focus detection area in calculating the BP correction value. More specifically, the position information of the focus detection area is substituted for x and y in the expression (2). Due to this calculation, the expression (2) is replaced with the expression (3) in the first embodiment. In this way, the camera MPU 125 obtains MTF_P_RH(f), MTF_P_RV(f), MTF_P_GH(f), MTF_P_GV(f), MTF_P_BH(f), and MTF_P_BV(f).

Figure 21B:
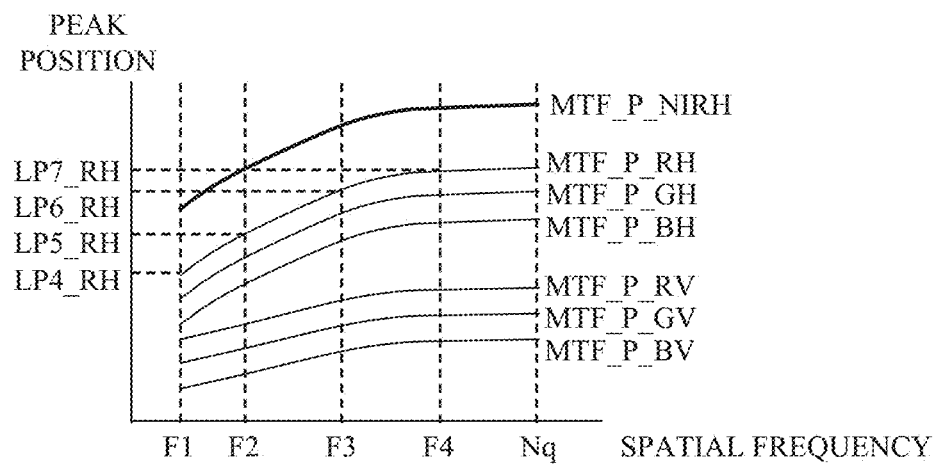

FIG. 21B illustrates illustrative aberration information after the position information of the focus detection area is substituted in S602, where the abscissa axis represents the spatial frequency and the ordinate axis represents the focus lens position (defocus MTF peak position). Nq indicates the Nyquist frequency determined by the pixel pitch of the image sensor 122.

As illustrated, a curve for each color deviates when a chromatic aberration amount is large, and illustrated horizontal and vertical curves deviate when the longitudinal and lateral differences is large. Thus, this embodiment has information on the defocus MTF corresponding to the spatial frequency for each combination of colors (R, G, and B) and evaluation directions (H and V). This configuration can calculate the BP correction value with a high accuracy.

Next, the camera MPU 125 weights twelve coefficients (FIG. 21A) in the setting information acquired in S201 by using aberration information. Thereby, the setting information is weighted with colors and directions to be evaluated in the focus detection and image capturing. More specifically, the camera MPU 125 calculates the MTF peak curve MTF_P_AF(f) indicating the spatial frequency characteristic for the focus detection and the MTF peak curve MTF_P_Img(f) indicating the spatial frequency characteristic for the captured image by using the expression (4) and (5) in the first embodiment.

Figure 21C:
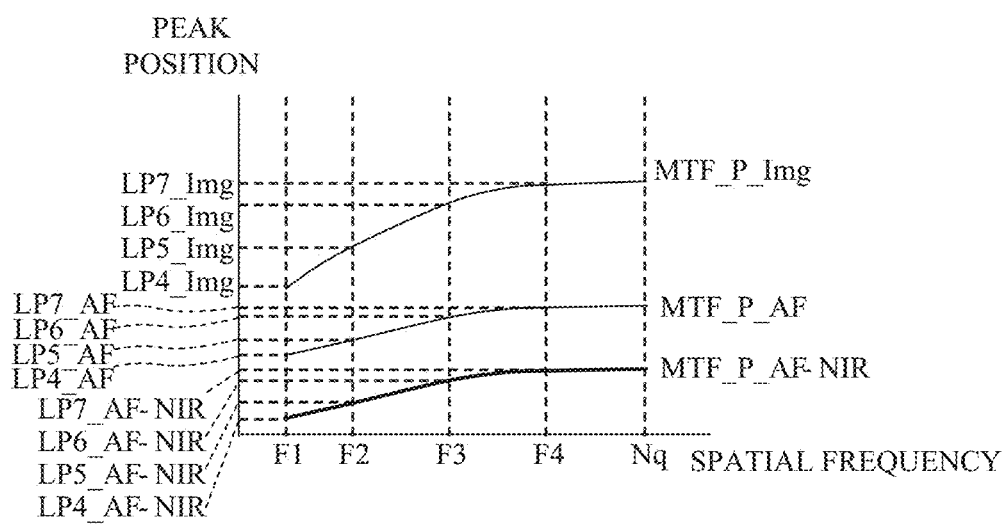

FIG. 21C illustrates illustrative MTF_P_AF (f) and MTF_P_Img(f) in a format similar to that of FIG. 21B. This embodiment calculates the position of the focus detection area and the variables with the color and direction to be evaluated before calculating the variable of the spatial frequency. As a result of the calculation. MTF_P_AF(f) and MTF_P_Img(f) are expressed by the expressions (6) and (7) in the first embodiment.

FIG. 21C illustrates the defocus MTF peak positions LP4_AF, LP5_AF, LP6_AF, and LP7_AF obtained by substituting the discrete spatial frequencies F1 to F4 for the expression (6) on the ordinate axis.

On the other hand, in S603, unlike S601, the camera MPU 125 acquires second aberration information that is aberration information when the auxiliary light is in the light emission state (auxiliary light flag=1). In this embodiment, the near-infrared and horizontal defocus MTF peak position (MTF_P_NIRH) is the second aberration information. The first aberration information and the second aberration information are different from each other with respect to at least one of the wavelength, the aberration direction, the image capturing distance, and the image height.

Each pixel on the image sensor 122 according to this embodiment has a photoelectric converter which is divided into two in the horizontal direction as illustrated in FIG. 3A. Therefore, the aberration direction of the near-infrared MTF peak curve is described only with the horizontal direction (MTF_P_NIRH). However, the present invention is not limited to this example, and may use the vertical direction (MTF_P_NIRV) or the like. This embodiment assumes the near-infrared auxiliary light, but the present invention is not limited to the near infrared and may acquire an MTF peak curve according to the wavelength characteristic of auxiliary light to be used. This embodiment acquires a plurality of MTF peak curves according to the object distance, but may acquire it only at a short distance because the arrival distance of the auxiliary light is short in the near infrared MTF peak curve.

Next, in S604, unlike S602, the camera MPU 125 acquires the setting information used to weight the aberration information obtained in S603 with the position of the focus detection area and the color and the contrast direction of the signal to be evaluated. The setting information acquired herein corresponds to the first calculation information for recording and imaging and the third calculation information for the auxiliary light AF.

First, the camera MPU 125 calculates aberration information using the position information of the focus detection area in calculating the BP correction value. More specifically, the position information of the focus detection area is substituted for x and y in the expression (2). Due to this calculation, the expression (2) is replaced with the following equation (19) for the near-infrared defocus and horizontal MTF peak position (MTF_P_NIRH).

$$MTF\_P\_NIRH(f)=A nirh \times f2+Brh \times f+Crh \quad (19)$$

The camera MPU 125 similarly calculates MTF_P_RV(f), MTF_P_GH(f), MTF_P_GV(f), MTF_P_BH(f), and MTF_P_BV(f).

Next, the camera MPU 125 weights twelve coefficients (FIG. 21A) in the setting information acquired in S201 with the aberration information. Thereby, the setting information is weighted with the color and the direction to be evaluated in the focus detection and imaging.

More specifically, the camera MPU 125 calculates the MTF peak curve MTF_P_AF−NIR(f) indicating the spatial frequency characteristic for the focus detection using the following equation (20).

$$MTF\_P\_AF-NIR(f)=K\_AF\_NIRH \times MTF\_P\_NIRH\\(f)+K\_AF\_RH \times MTF\_P\_RH(f)+K\_AF\_RV \times MTF\_P\_RV(f)+K\_AF\_GH \times MTF\_P\_GH(f)+K\_AF\_GV \times MTF\_P\_GV(f)+K\_AF\_BH \times MTF\_P\_BH(f)+K\_AF\_BV \times MTF\_P\_BV(f) \quad (20)$$

The camera MPU 125 calculates the MTF peak curve MTF_P_Img(f) indicating the spatial frequency characteristic for the captured image by using the expression (5).

In the expression (18), K_AF_NIRH, K_AF_RH, K_AF_GH, K_AF_BH, K_AF_RV, K_AF_GV, and K_AF_BV are weighting coefficients for the focus detection (AF). The weighting coefficients use the weighting coefficients for the auxiliary light AF (third calculation information) K_AF_NIRH, K_AFL_RH, K_AFL_GH, K_AFL_BH, K_AFL_RV, K_AFL_GV and K_AFL_BV shown in FIG. 21A. The weighting coefficient for the auxiliary light AF has a weighting value only for the near-infrared light when the second aberration information contains only near-infrared aberration information.

This embodiment calculates the position of the focus detection area and the variables with the color and direction to be evaluated before calculating the variable of the spatial frequency. As a result of the calculation, MTF_P_AF−NIR (f) and MTF_P_Img(f) are expressed by the following expression (21) and (7) shown in the first embodiment.

$$MTF\_P\_AF-NIR(f)=Aaf \times f2+Baf \times f+Caf \quad (21)$$

$$MTF\_P\_Img(f)=Aimg \times f2+Bimg \times f+Cimg \quad (7)$$

In this manner, the defocus MTF peak positions LP4_AFS, LP5_AFS, LP6_AFS, and LP7_AF (none of which are illustrated) in the discrete spatial frequencies F1 to F4 in FIG. 21C are obtained by substituting F1 to F4 for the expression (21).

Next, in S207, the camera MPU 125 stores LP4_AF to LP7_AF (or unillustrated LP4_AFS to LP7_AFS) illustrated in FIG. 21C as the peak coefficient MTF_P_AF(n) (1≤n≤4) in the lens memory 118 or the RAM 125*b*. In addition, the camera MPU 125 stores LP4_Img to LP7_Img as the peak coefficient MTF_P_Img (n) (1≤n≤4) in the lens memory 118 or the RAM 125*b* and performs the processing in S208 to S210.

As described in the first embodiment, the camera MPU 125 that calculates the BP correction value in S210 calculates the in-focus position (P_img) of the captured image and the in-focus position (P_AF) detected in the AF (normal light AF and auxiliary light AF) by the expressions (8) and (9), respectively. The in-focus position of the captured image corresponds to the first focal position, and the in-focus position detected by the ordinary light AF corresponds to the second focal position. The in-focus position detected by the auxiliary light AF corresponds to the third focal position.

The camera MPU 125 calculates the BP correction value for the normal light AF by setting P_AF in the equation (10) to the in-focus position detected by the normal light M. The BP correction value for the auxiliary light AF is calculated by setting P_AF in the expression (10) to the in-focus position detected by the auxiliary light AF.

This embodiment changes the aberration information and the weighting coefficient for the focus detection when the auxiliary light is emitted, from those when the auxiliary light is not emitted, and calculates the MTF peak curve MTF_P_AF-NIR(f) indicating the spatial frequency characteristic for the focus detection. This configuration can calculate the BP correction value by using the aberration information suitable for the color of the auxiliary light and the weight of the focus detection signal when the auxiliary light is emitted, and highly accurately correct the focus detection result.

Sixth Embodiment

Next follows a sixth embodiment according to the present invention. Referring now to FIGS. 22 to 24B, a description will be given of the AF processing according to this embodiment. The fifth embodiment used one type of auxiliary light, and changed the weighting coefficient for the focus detection depending on whether or not to emit the auxiliary light. However, the auxiliary light has various types of light such as red, green, orange, infrared, and white, which have different spectroscopic characteristics from each other. This embodiment corrects the focus detection result by using the MTF peak curve corresponding to the spectroscopic characteristic of each auxiliary light, and thereby highly accurately detects a focus state regardless of the type of auxiliary light.

Figure 22:
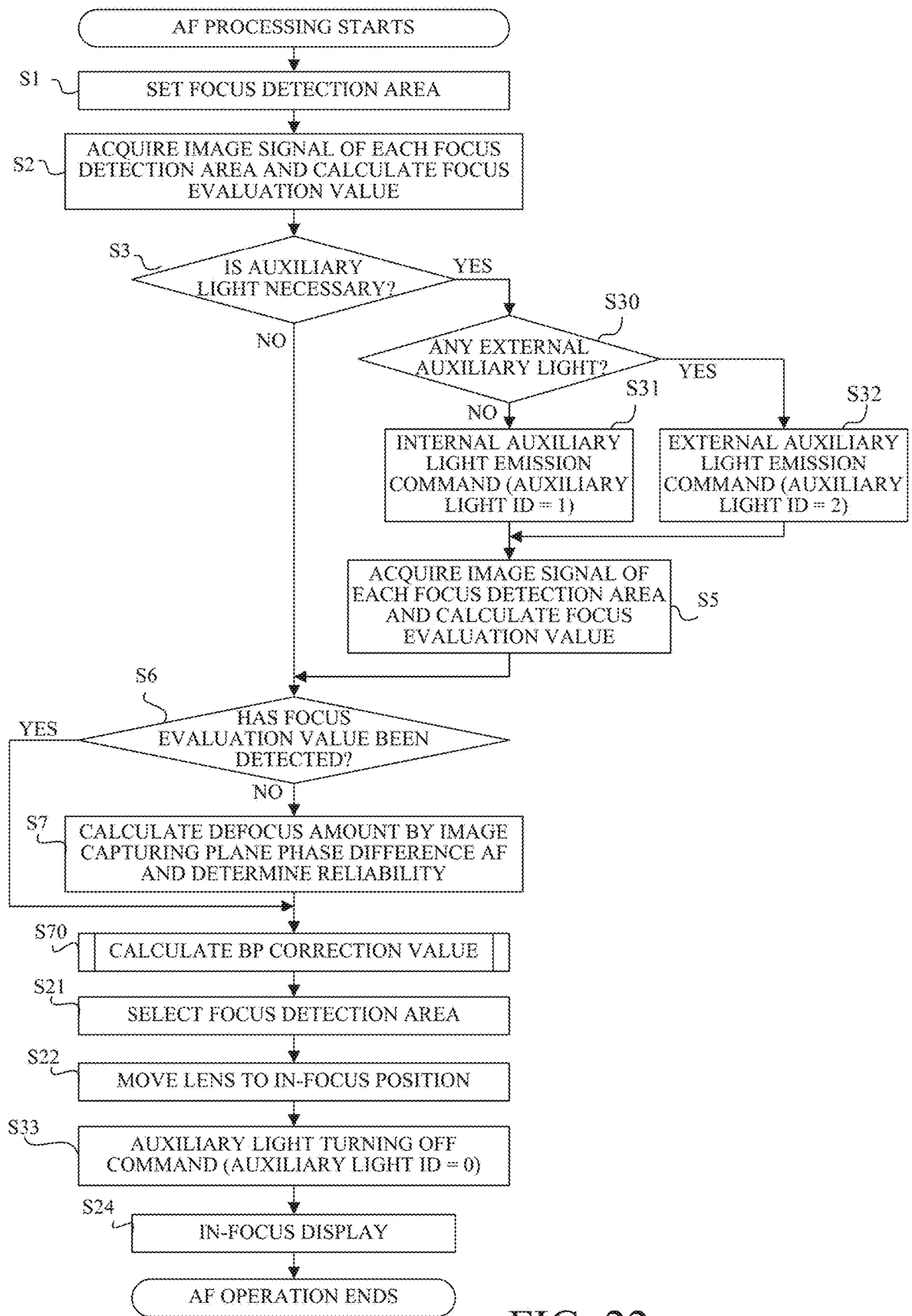
FIG. 22 is a flowchart of AF processing according to a sixth embodiment.

In the flowchart of FIG. 22, those steps which are corresponding steps in the AF processing (FIGS. 10 and 16) in the second and fifth embodiments will be designated by the same step numerals. The flowchart of FIG. 22 differs from the fifth embodiment in that there are two types of auxiliary light used, i.e., internal auxiliary light and external auxiliary light, when auxiliary light is required (Yes in S3). The internal auxiliary light is emitted from the auxiliary light emitter 200 illustrated in FIG. 2 in the first embodiment. The external auxiliary light is emitted from an external auxiliary light emitter provided in an external flash unit attachable to the camera main body 120. In this embodiment, the internal auxiliary light has a spectroscopic characteristic centered on green, and the external auxiliary light has spectroscopic characteristics with a center of the near-infrared to red.

In S3, the camera MPU 125 that has determined that the auxiliary light is necessary proceeds to S30 and determines whether or not there is an external auxiliary light emitter or whether or not the external auxiliary light can be emitted. If the external auxiliary light cannot be emitted, the camera MPU 125 proceeds to S31 and instructs the light emission of the internal auxiliary light. At this time, the auxiliary light ID is set to 1.

If the external auxiliary light can be emitted, the camera MPU 125 proceeds to S32 and instructs the external auxiliary light to be emitted. Then, the camera MPU 125 sets the auxiliary light ID to 2. As described in the second embodiment, this embodiment assumes that the spectroscopic characteristic of the external auxiliary light is known. However, the information on the spectroscopic characteristic may be acquired from the external flash unit. The camera MPU 125 may acquire information indicating the spectroscopic characteristic from the external flash unit or information on the type of external auxiliary light, and set a predetermined auxiliary light ID according to the information.

The camera MPU 125 that has finished emitting the auxiliary light in S31 and S32 proceeds to S5 to S7, then S70 in case of Yes in S6, and performs the BP correction value calculation processing. The BP correction value calculation processing will be described later.

The camera MPU 125 that has finished the processing of S70 performs the processing of S21, S22, S33, and S24, and ends the AF processing.

Figure 23:
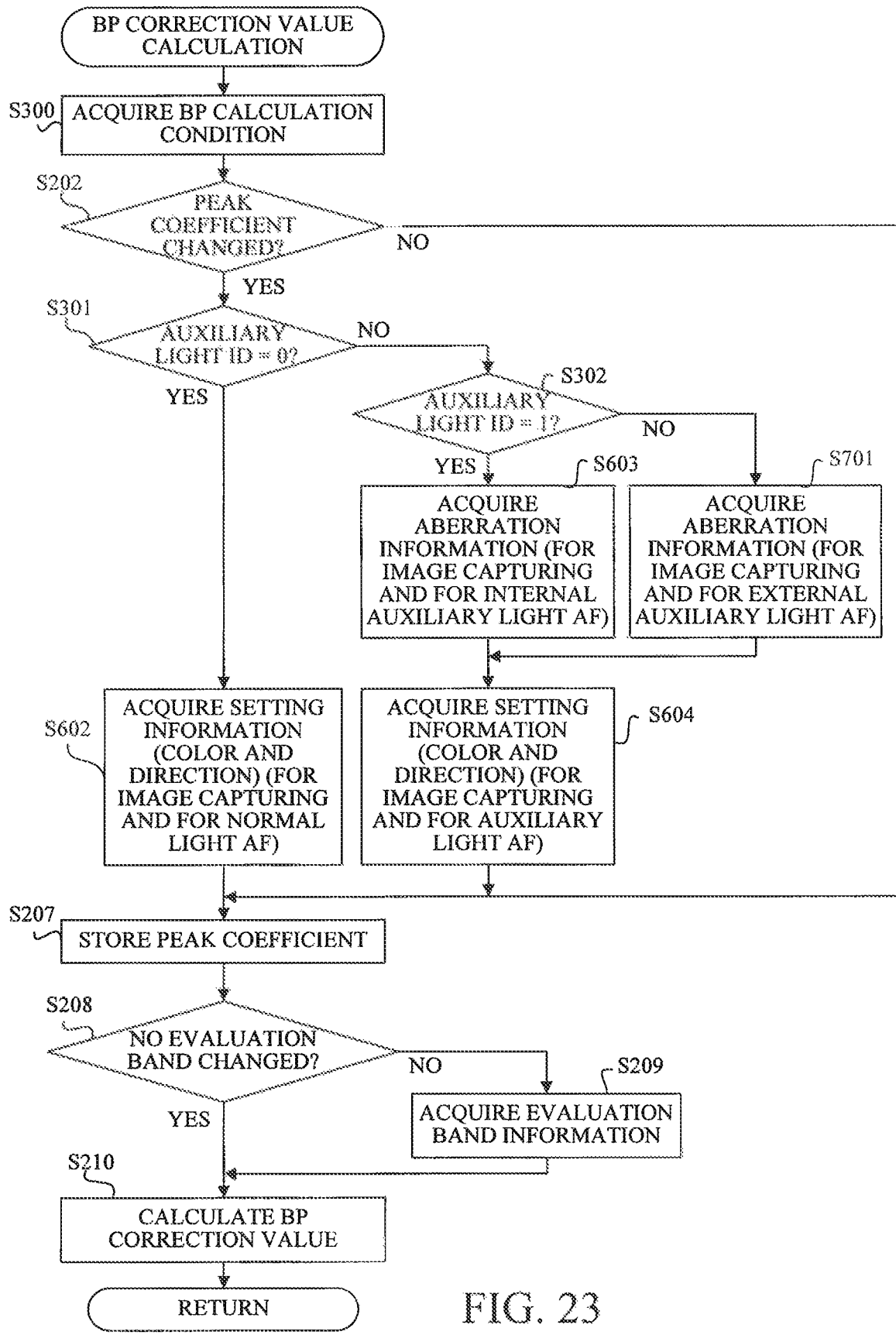
FIG. 23 is a flowchart of BP correction value calculation processing according to the sixth embodiment.

Referring now to a flowchart of FIG. 23, a detailed description will be given of the BP correction value calculation processing performed by the camera MPU 125 in S70. In FIG. 23, those steps which are corresponding to those shown in the second embodiment (FIG. 11) and the fifth embodiment (FIG. 20) will be designated by the same step numerals.

The camera MPU 125 that has finished the processing of S300 and S202 determines whether the auxiliary light ID is 0 or whether or not the external auxiliary light is in the non-emission state in S301. The flow moves to S602 in the non-emission state, and the flow moves to S302 in the emission state. In S302, the camera MPU 125 determines whether the auxiliary light ID is 1 or whether the internal auxiliary light is in the emission state or the external auxiliary light is in the emission state. If the internal auxiliary light is in the emission state, the camera MPU 125 proceeds to S603, and if the external auxiliary light is in the emission state, the camera MPU 125 proceeds to S701.

Similar to the fifth embodiment, in S603, the camera MPU 125 acquires the MTF peak curve for the internal auxiliary light AF. The camera MPU 125 uses the weighting coefficients (K_AFLin_RH, K_AFLin_GH, K_AFLin_BH, K_AFLin_RV, K_AFLin_GV, and K_AFLin_BV) for the internal auxiliary light AF illustrated in FIG. 24A.

In next S604, the camera MPU 125 acquires the setting information for weighting the aberration information obtained in step S603 with the position of the focus detection area and the color and the contrast direction of the signal to be evaluated.

On the other hand, in S701, the camera MPU 125 acquires the MTF peak curve for the external auxiliary light AF. At this time, the camera MPU 125 uses weighting coefficients (K_AFL_NIRH, K_AFL_RH, K_AFL_GH, K_AFL_BH, K_AFL_RV, K_AFL_GV, and K_AFL_BV) for the external auxiliary light AF illustrated in FIG. 24A. In S604, the camera MPU 125 acquires setting information for weighting the aberration information obtained in step S701 with the position of the focus detection area and the color and the contrast direction of the signal to be evaluated.

FIG. 24B illustrates illustrative MTF peak curves of external auxiliary light and internal auxiliary light. The MTF peak curve is different between the ordinary light use illustrated in FIG. 21B and the auxiliary light (external auxiliary light and internal auxiliary light) use illustrated in FIG. 24B. The auxiliary light use differs between the internal auxiliary light use (MTF_P_AFin) and the external auxiliary light use (MTF_P_AFout).

The image sensor 122 according to this embodiment includes a photoelectric converter divided into two in the horizontal direction as illustrated in FIG. 3A. Therefore, this embodiment describes only the horizontal MTF peak curve (MTF_P_NIRH) as the near-infrared MTF peak curve. However, this embodiment is not limited, and may further use a vertical MTF peak curve (MTF_P_NIRH) or the like. This embodiment describes the internal auxiliary light having a spectroscopic characteristic with a center of green and the external auxiliary light having a spectroscopic characteristic with a center of near-infrared to red. However, this embodiment is not limited, and may acquire MTF peak curves corresponding to the wavelength characteristics of the internal auxiliary light and the external auxiliary light to be used.

The MTF peak curve of the internal auxiliary light may be previously stored in the RAM 125b in the camera and the MTF peak curve of the external auxiliary light may be stored in the flash unit. Then, the camera MPU 125 may acquire the MTF peak curve from the flash unit when the flash unit is attached to the camera body 120 or when the external auxiliary light is emitted.

A corresponding image height may be changed by the internal auxiliary light and the external auxiliary light. For example, since the spectroscopic characteristic according to this embodiment shows that an irradiation range of the internal auxiliary light is wider than that of the external auxiliary light, a correspondence image height for the external auxiliary light according to this embodiment may be limited in comparison with that for internal auxiliary light.

When the internal auxiliary light and the external auxiliary light are emitted, the camera MPU 125 calculate the MTF peak curves MTF_P_AFin(f) and MTF_P_AFout(f) indicating the spatial frequency characteristic for the focus detection by using the setting information illustrated in FIG. 21A.

This embodiment can calculate an appropriate BP correction value for each auxiliary light, when a plurality of types of light can be used as auxiliary light, and perform a highly accurate focus detection.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-207731, filed on Oct. 27, 2017, which is hereby incorporated by reference herein in its entirety.

What is claimed is:

1. An image capturing apparatus comprising:
an image sensor configured to capture an object image formed from light that enters an image capturing, optical system from an object; and
a focus detector configured to provide a focus detection using focus detecting signal from the image sensor,
wherein the focus detector corrects a result of the focus detection by using a difference between a first focus position calculated as a focus position in image capturing by using aberration information of the image capturing optical system and first calculation information according to a spectroscopic characteristic of first light and a second focus position, calculated as a focus position in the focus detection by using the aberration information and second calculation information according to the spectroscopic characteristic of the first light, and changes the second calculation information in the focus detection between when second light having a spectroscopic characteristic different from that of the first light is emitted to the object, and when the second light is not emitted.

2. The image capturing apparatus according to claim 1, wherein the focus detector changes the second calculation information according to the spectroscopic characteristic of the second light.

3. The image capturing apparatus according to claim 1, further comprising a memory configured to store each calculation information, or the focus detector acquires each calculation information from a memory provided to an interchangeable lens.

4. The image capturing apparatus according to claim 1, wherein each calculation information is weighting calculation information according to the spectroscopic characteristic of the first or second light.

5. The image capturing apparatus according to claim 1, wherein the second light has a wavelength region longer than that of the first light.

6. The image capturing apparatus according to claim 1, wherein the focus detector acquires second object spectroscopic information on a spectroscopic characteristic of the object when the second light is not emitted, by using first object spectroscopic information on the spectroscopic characteristic of the object obtained by a focus detection signal from the image sensor when the second light is emitted and information of the spectroscopic characteristic of the second light, and acquires the first calculation information by using the second object spectroscopic information.

7. An image capturing, apparatus comprising:
age sensor configured to capture an object image formed from t that enters an image capturing optical system from an object; and
a focus detector configured to provide a focus detection using a focus detecting signal from the image sensor,
wherein the focus detector corrects a result of the focus detection by using a difference between a first focus position calculated as a focus position in image capturing by using aberration information of the image capturing optical system and first calculation information according to a spectroscopic characteristic of first light and a second focus position calculated as a focus position in the focus detection by using the aberration information and second calculation information according to the spectroscopic characteristic of the first light, and changes, when second light having a spectroscopic characteristic different from that of the first light is emitted to an object in the focus detection, the second calculation information according to the spectroscopic characteristic of the second light.

8. An image capturing apparatus comprising:
an image sensor configured to capture an object image formed from light that enters an image capturing optical system from an object; and
a focus detector configured to provide a focus detection using a focus detecting signal from the image sensor,
wherein the focus detector corrects a result of the focus detection by using a difference between a first focus position calculated as a focus position in image capturing by using aberration information of the image capturing optical system and first calculation information according to a spectroscopic characteristic of first light and a second focus position calculated as a focus position in the focus detection by using the aberration information and second calculation information according to the spectroscopic characteristic of the first light, and
wherein the focus detector acquires, when second light having a spectroscopic characteristic different from that of the first light is emitted to the object in the focus detection, a third focus position according to the spectroscopic characteristic of the second light by using the aberration information and the second calculation information, and corrects the result of the focus detection by using a difference between the first focus position and the third focus position.

9. The image capturing apparatus according to claim 8, wherein the focus detector acquires the third focus position by an extrapolation operation using the aberration information and the second calculation information when the second light is emitted.

10. An image capturing apparatus comprising:
an image sensor configured to capture an object image formed frorax light that enters an image capturing optical system from an object; and
a focus detector configured to provide a focus detection using a focus detecting signal from the image sensor,
wherein the focus detector corrects a result of the focus detection by using a difference between a first focus position calculated as a focus position in image capturing by using aberration information of the image capturing optical system and first calculation information according to a spectroscopic characteristic of first light and a second focus position calculated as a focus position in the focus detection by using the aberration information and second calculation information according to the spectroscopic characteristic of the first light, and
wherein the focus detector corrects, when second light having a spectroscopic characteristic different from that of the first light is emitted to the object in the focus detection, the result of the focus detection by using a difference between the first focus position and a third focus position calculated by using the aberration information and third calculation information according to the spectroscopic characteristic of the second light.

11. An image capturing apparatus comprising:
an image sensor configured to capture an object image formed froth light that enters an image capturing optical system from an object; and
a focus detector configured to provide a focus detection using a focus detecting signal the image sensor,
wherein the focus detector corrects a result of the focus detection by using a difference between a first focus position calculated as a focus position in image capturing by using first aberration information of the image capturing optical system according to the spectroscopic characteristic of first light and first calculation information according to a spectroscopic characteristic of the first light and a second focus position calculated as a focus position in the focus detection by using the aberration information and second calculation information according to the spectroscopic characteristic of the first light, and
wherein the focus detector corrects, when second light having a spectroscopic characteristic different from that of the first light is emitted to the object in the focus detection, the result of the focus detection by using a difference between the first focus position and a third focus position calculated by using second aberration information of the image capturing optical system according to the spectroscopic characteristic of the second light and third calculation information according to the spectroscopic characteristic of the second light.

12. The image capturing apparatus according to claim 11, wherein the first aberration information and the second aberration information are different from each other in at least one of a wavelength, an aberration direction, an image capturing distance, and an image height.

13. The image capturing apparatus according to claim 11, wherein the focus detector changes the third calculation information according to the spectroscopic characteristic of the second light.

14. A focus detection method for an image capturing apparatus that includes an image sensor configured to capture an object image formed from light that enters an image capturing optical system from an object, the focus detection method performing a focus detection using a focus detecting signal from the image sensor and comprising the steps of:
correcting a result of the focus detection by using a difference between a first focus position calculated as a focus position in image capturing by using aberration information of the image capturing optical system and first calculation information according to a spectroscopic characteristic of first light and a second focus position calculated as a focus position in the focus detection by using the aberration information and second calculation information according to the spectroscopic characteristic of the first light; and
changing the second calculation information in the focus detection between when second light having a spectroscopic characteristic different from that of the first light is emitted to the object, and when the second light is not emitted.

15. A focus detection method for an image capturing apparatus that includes an image sensor configured to capture an object image formed from light that enters an image capturing optical system from an object, the focus detection method performing a focus detection using a focus detecting signal from the image sensor and comprising the step of correcting a result of the focus detection by using a difference between a first focus position calculated as a focus position in image capturing by using aberration information of the image capturing optical system and first calculation information according to a spectroscopic characteristic of first light and a second focus position calculated as a focus position in the focus detection by using the aberration information and second calculation information according to the spectroscopic characteristic of the first light, and changes, when second light having a spectroscopic characteristic different from that of the first light is emitted to the object in the focus detection, the second calculation information according to the spectroscopic characteristic of the second light.

16. A focus detection method for an image capturing apparatus that includes an image sensor configured to capture an object image formed from light that enters an image capturing optical system from an object, the focus detection method performing a focus detection using a focus detecting signal from the image sensor and comprising the steps of:
correcting a result of the focus detection by using a difference between a first focus position calculated as a focus position in image capturing by using aberration information of the image capturing optical system and first calculation information according to a spectroscopic characteristic of first light and a second focus position calculated as a focus position in the focus detection by using the aberration information and second calculation information according to the spectroscopic characteristic of the first light, and
acquiring, when second light having a spectroscopic characteristic different from that of the first light is emitted to the object in the focus detection, a third focus position according to the spectroscopic characteristic of the second light by using the aberration formation and the second calculation information, and corrects the result of the focus detection by using a difference between the first focus position and the third focus position.

17. A focus detection method for an image capturing apparatus that includes an image sensor configured to capture an object image formed from light that enters an image capturing optical system from an object, the focus detection method performing a focus detection using a focus detecting signal from the image sensor and comprising the steps of:
correcting a result of the focus detection by using a difference between a first focus position calculated as a focus position in image capturing by using aberration information of the image capturing optical system and first calculation information according to a spectroscopic characteristic of first light and a second focus position calculated as a focus position in the focus detection by using the aberration information and second calculation information according to the spectroscopic characteristic of the first light, and
correcting, when second light having a spectroscopic characteristic different from that of the first light is emitted to the object in the focus detection, the result of the focus detection by using a difference between the first focus position and a third focus position calculated by using the aberration information and third calculation information according to the spectroscopic characteristic of the second light.

18. A focus detection method for n image capturing apparatus that includes an image sensor configured to capture an object image formed from light that enters an image capturing optical system from an object, the focus detection method performing a focus detection using a focus detecting signal from the image sensor and comprising the steps of:

correcting a result of the focus detection by using a difference between a first focus position calculated as a focus position in image capturing by using first aberration information of the image capturing optical system according to the spectroscopic characteristic of first light and first calculation information according to a spectroscopic characteristic of the first light and a second focus position calculated as a focus position in the focus detection by using the first aberration information and second calculation information according to the spectroscopic characteristic of the first light, and correcting, when second light having a spectroscopic characteristic different from that of the first light is emitted to the object in the focus detection, the result of the focus detection by using a difference between the first focus position and a third focus position calculated by using second aberration information of the image capturing optical system according to the spectroscopic characteristic of the second light and third calculation information according to the spectroscopic characteristic of the second light.

19. A storage medium storing a computer program that enables a computer an image capturing apparatus that includes an image sensor configured to capture an object image formed from light that enters an image capturing optical system from an object, to execute a focus detecting method according to claim 6.

20. A storage medium storing a computer program that enables a computer in an image capturing apparatus that includes an image sensor configured to capture an object image formed from light that enters an image capturing optical system from an object, to execute a focus detecting method according to claim 14.

21. A storage medium storing a computer program that enables a computer in an image capturing apparatus that includes an image sensor configured to capture an object image formed from light that enters an image capturing optical system from an object, to execute a focus detecting method according to claim 15.

22. A storage medium storing a computer program that enables a computer in an image capturing apparatus that includes an image sensor configured to capture an object image formed from light that enters an image capturing optical system from an object, to execute a focus detecting method according to claim 16.

23. A storage medium storing a computer program that enables a computer in an image capturing apparatus that includes an image sensor configured to capture an object image formed from light that enters an image capturing optical system from an object, to execute a focus detecting method according to claim 17.

* * * * *